US011506824B2

(12) United States Patent
Moon

(10) Patent No.: US 11,506,824 B2
(45) Date of Patent: Nov. 22, 2022

(54) CIRCUIT FOR CONTROLLING LIQUID LENS

(71) Applicant: LG INNOTEK CO., LTD., Seoul (KR)

(72) Inventor: Young Seop Moon, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 523 days.

(21) Appl. No.: 16/604,487

(22) PCT Filed: Apr. 11, 2018

(86) PCT No.: PCT/KR2018/004222
§ 371 (c)(1),
(2) Date: Oct. 10, 2019

(87) PCT Pub. No.: WO2018/190627
PCT Pub. Date: Oct. 18, 2018

(65) Prior Publication Data
US 2020/0064524 A1 Feb. 27, 2020

(30) Foreign Application Priority Data

Apr. 11, 2017 (KR) .................. 10-2017-0046967
Apr. 11, 2017 (KR) .................. 10-2017-0046975
Apr. 11, 2017 (KR) .................. 10-2017-0046976

(51) Int. Cl.
G02B 3/14 (2006.01)
G02B 27/64 (2006.01)
(Continued)

(52) U.S. Cl.
CPC ............... G02B 3/14 (2013.01); G02B 27/64 (2013.01); H04N 5/23248 (2013.01); G03B 13/36 (2013.01); G03B 17/12 (2013.01)

(58) Field of Classification Search
CPC ........ G02B 26/005; G02B 27/64; G02B 3/14; G02B 27/646; G03B 13/32; G03B 13/36; G03B 17/12; H04N 5/232; H04N 5/23248
See application file for complete search history.

(56) References Cited

U.S. PATENT DOCUMENTS 7,697,187 B2 * 4/2010 Kato .................. G11B 7/13925
359/228
7,897,899 B2 3/2011 Uchino
(Continued)

FOREIGN PATENT DOCUMENTS

CN 101578545 A 11/2009
CN 104583816 A 4/2015
(Continued)

Primary Examiner — Joseph P Martinez
Assistant Examiner — Vipin Patel
(74) Attorney, Agent, or Firm — Birch, Stewart, Kolasch & Birch, LLP

(57) ABSTRACT

A circuit for controlling liquid lens includes a liquid lens including a common electrode and a plurality of individual electrodes including first to fourth individual electrodes, a voltage generator configured to supply a voltage to the plurality of individual electrodes and the common electrode in the liquid lens, and a controller configured to control timing to sequentially supply the voltage to each of the individual electrodes, wherein the controller applies the voltage to the second individual electrode after applying the voltage to the first individual electrode, applies the voltage to the third individual electrode after applying the voltage to the second individual electrode, and applies the voltage to the fourth individual electrode after applying the voltage to the third individual electrode, and wherein the first to fourth individual electrodes are disposed at the same angular interval from each other with respect to a center of the liquid lens.

20 Claims, 12 Drawing Sheets (a)

(b)

(51) Int. Cl.
  *H04N 5/232*  (2006.01)
  *G03B 13/36*  (2021.01)
  *G03B 17/12*  (2021.01)

(56)  References Cited

U.S. PATENT DOCUMENTS

| | | |
|---|---|---|
| 7,986,178 B2 | 7/2011 | Lynch |
| 8,355,209 B2 | 1/2013 | Tsuji et al. |
| 2008/0062529 A1 | 3/2008 | Helwegen et al. |
| 2009/0015918 A1 | 1/2009 | Morozumi et al. |
| 2009/0127123 A1* | 5/2009 | Raccurt .................. G02B 3/14 |
| | | 205/334 |
| 2009/0302197 A1 | 12/2009 | Uchino et al. |
| 2011/0211262 A1 | 9/2011 | Craen et al. |
| 2014/0017625 A1 | 1/2014 | Liu et al. |
| 2014/0307330 A1 | 10/2014 | Tsai |
| 2015/0104165 A1 | 4/2015 | Kim |
| 2015/0124311 A1 | 5/2015 | Berge et al. |

FOREIGN PATENT DOCUMENTS

| | | |
|---|---|---|
| CN | 106168727 A | 11/2016 |
| EP | 1906213 A1 | 4/2008 |
| EP | 2071367 A1 | 6/2009 |
| JP | JP 59-176652 A | 10/1984 |
| JP | 2001-249261 A | 9/2001 |
| JP | 2006-78843 A | 3/2006 |
| JP | 2006-520918 A | 9/2006 |
| JP | 2009-47801 A | 3/2009 |
| JP | 2012-128029 A | 7/2012 |
| KR | 10-2007-0120773 A | 12/2007 |
| KR | 10-2008-0035509 A | 4/2008 |
| KR | 10-2009-0018965 A | 2/2009 |
| WO | WO 2004/099844 A1 | 11/2004 |
| WO | WO 2004/099846 A | 11/2004 |

\* cited by examiner

[FIG. 1]
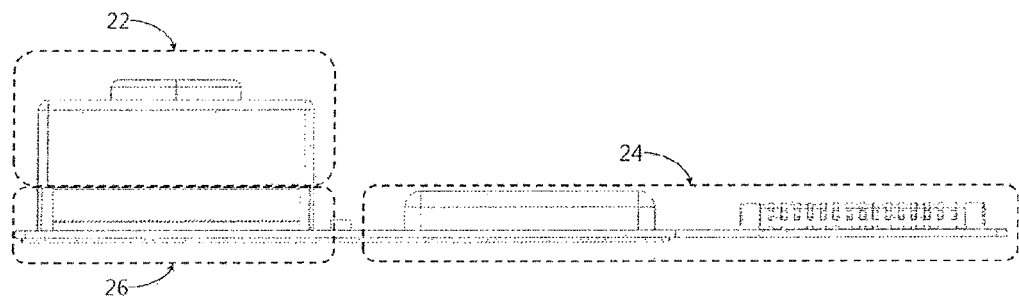
[FIG. 2]
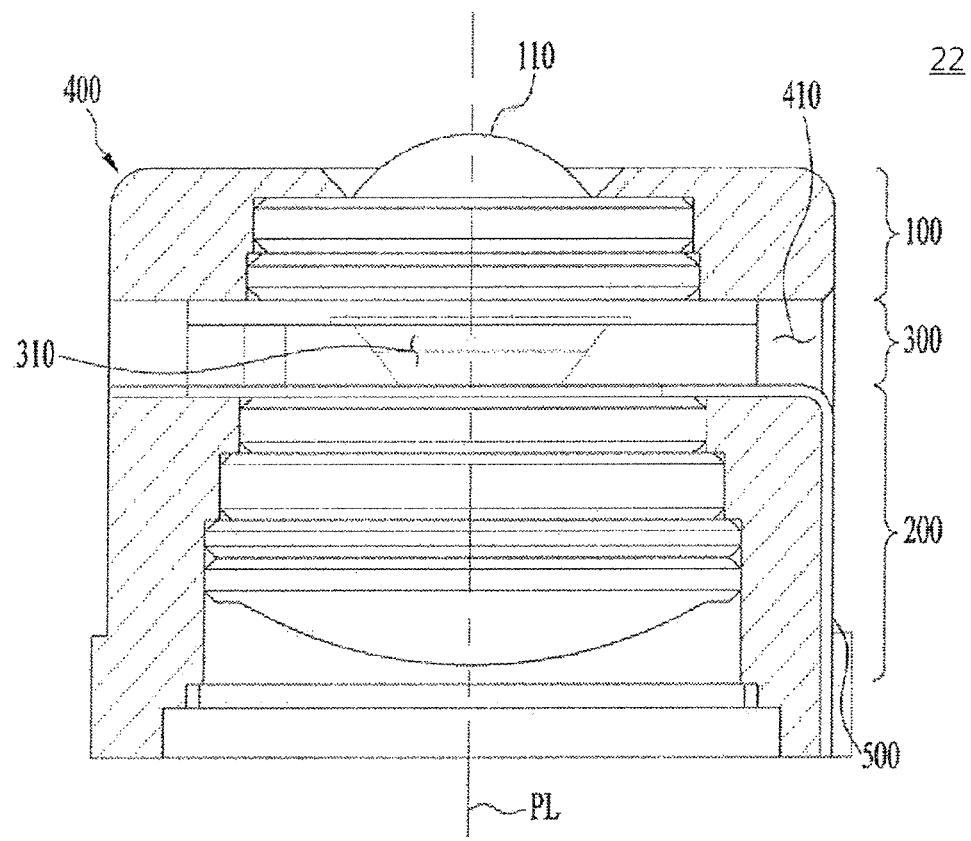

[FIG. 3]
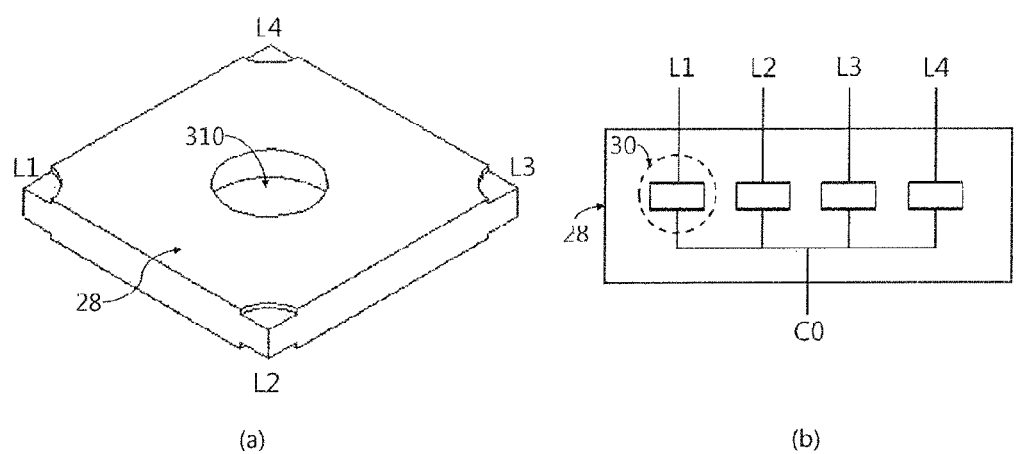
(a)         (b)
[FIG. 4]
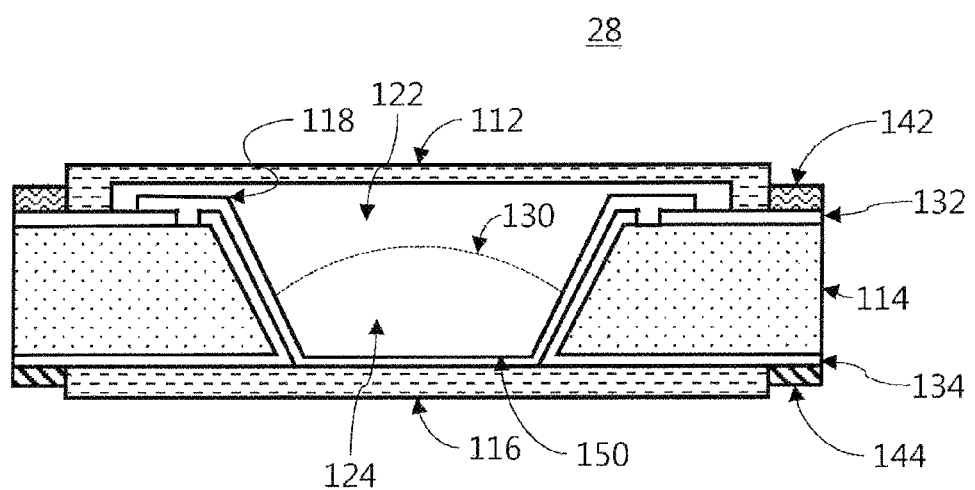

【FIG. 5】
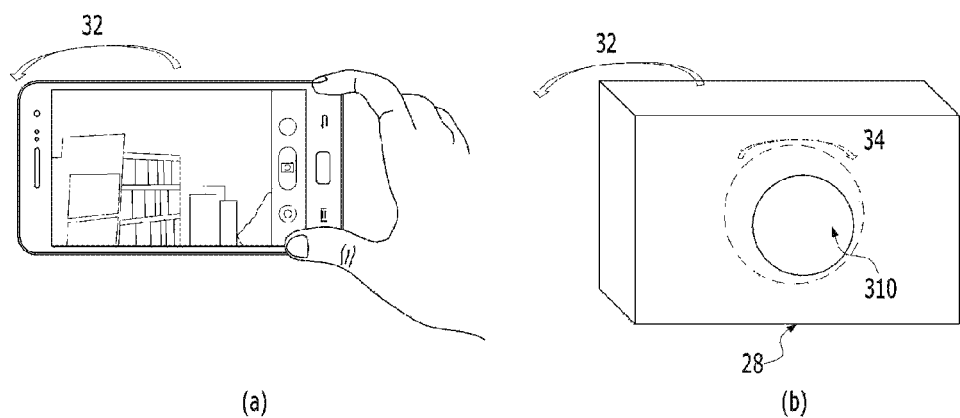
(a)　　　　　　　　　　　　(b)
【FIG. 6】
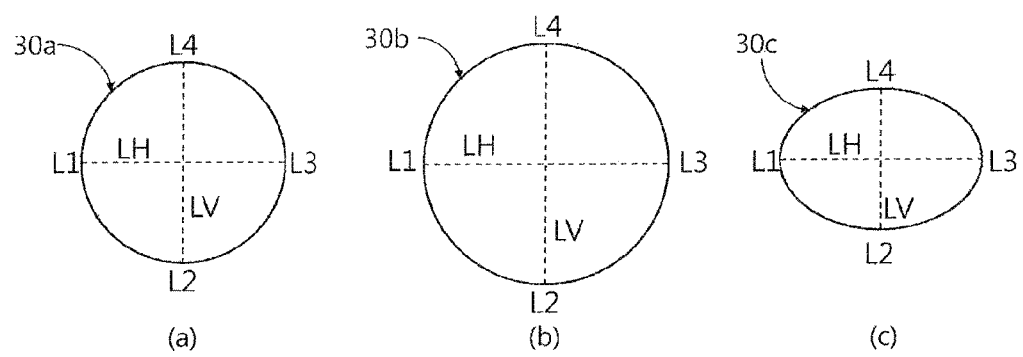
(a)　　　　　　　　　　(b)　　　　　　　　　　(c)

[FIG. 7]
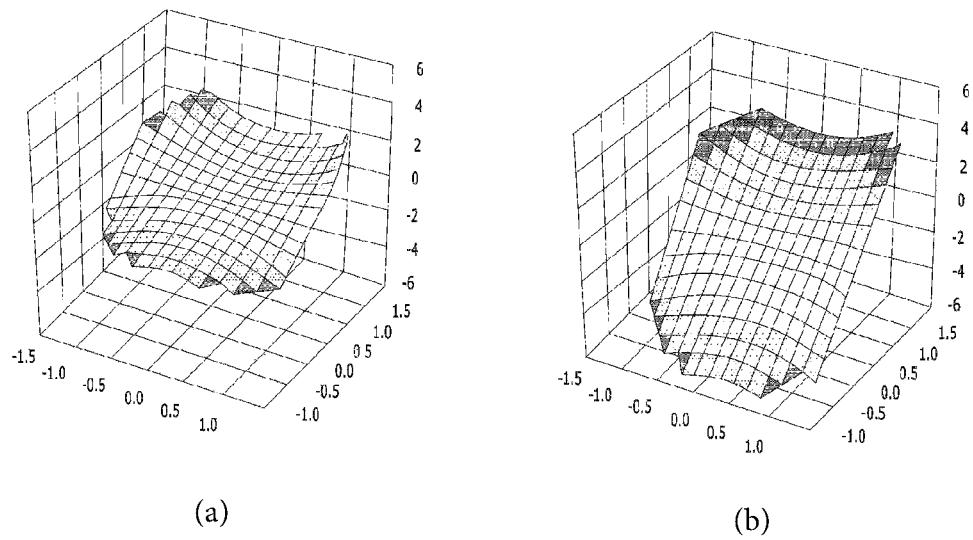
(a)                               (b)
[FIG. 8]
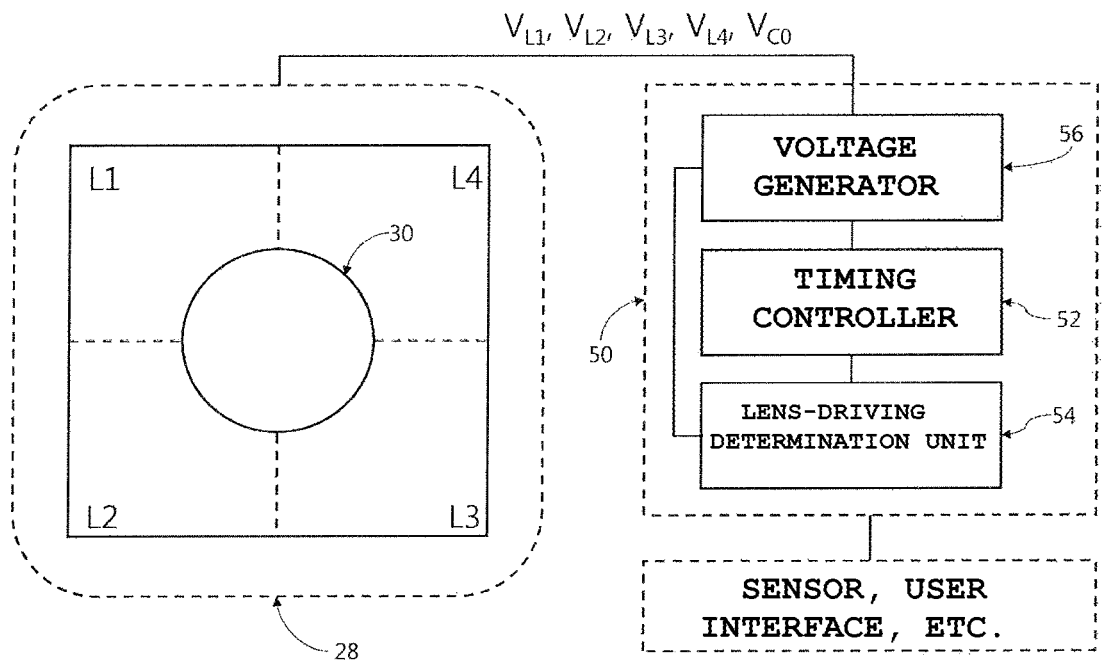

【FIG. 9】
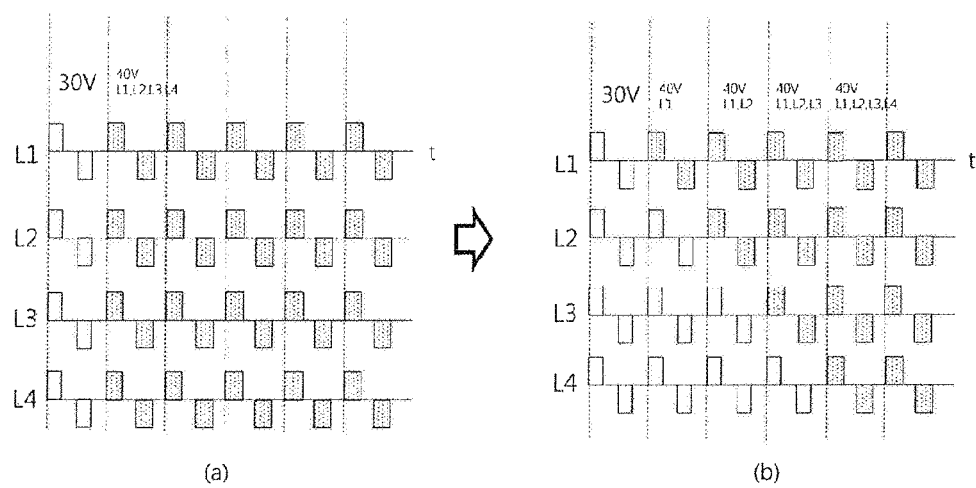

【FIG. 10】
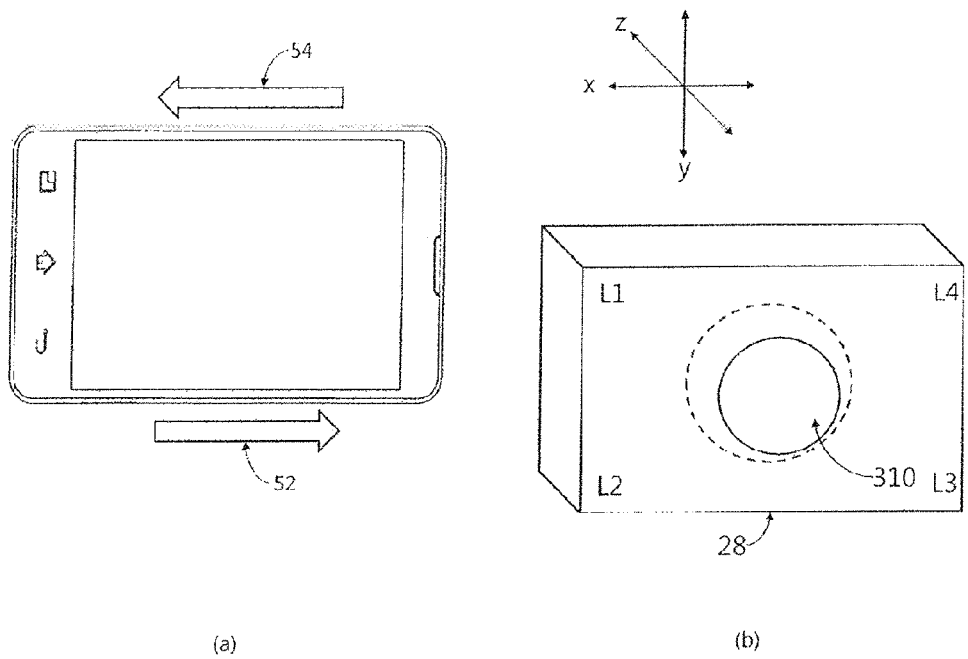
(a)          (b)

[FIG. 11]
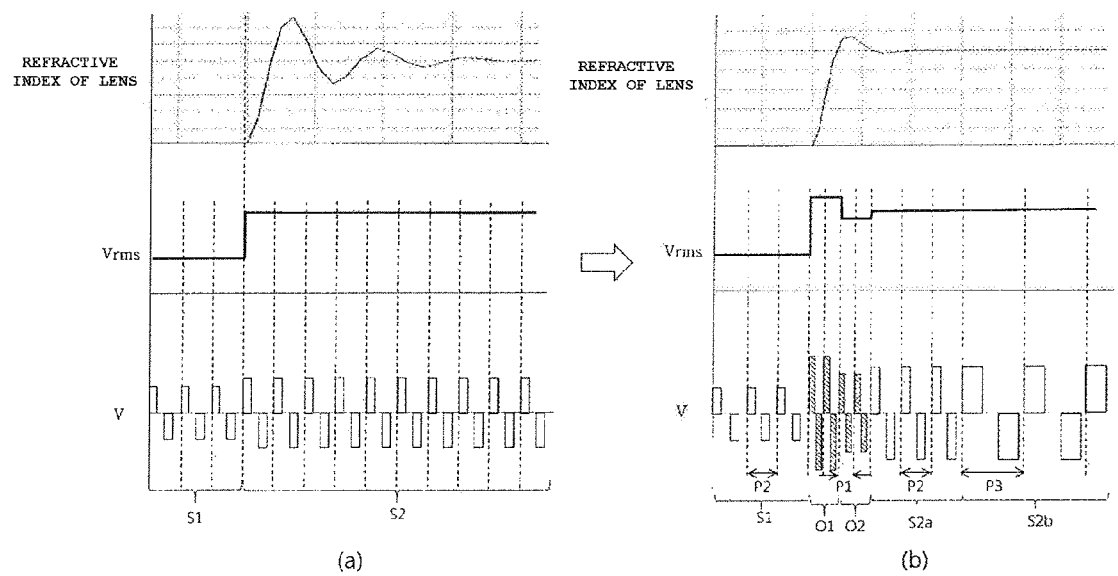

[FIG. 12]
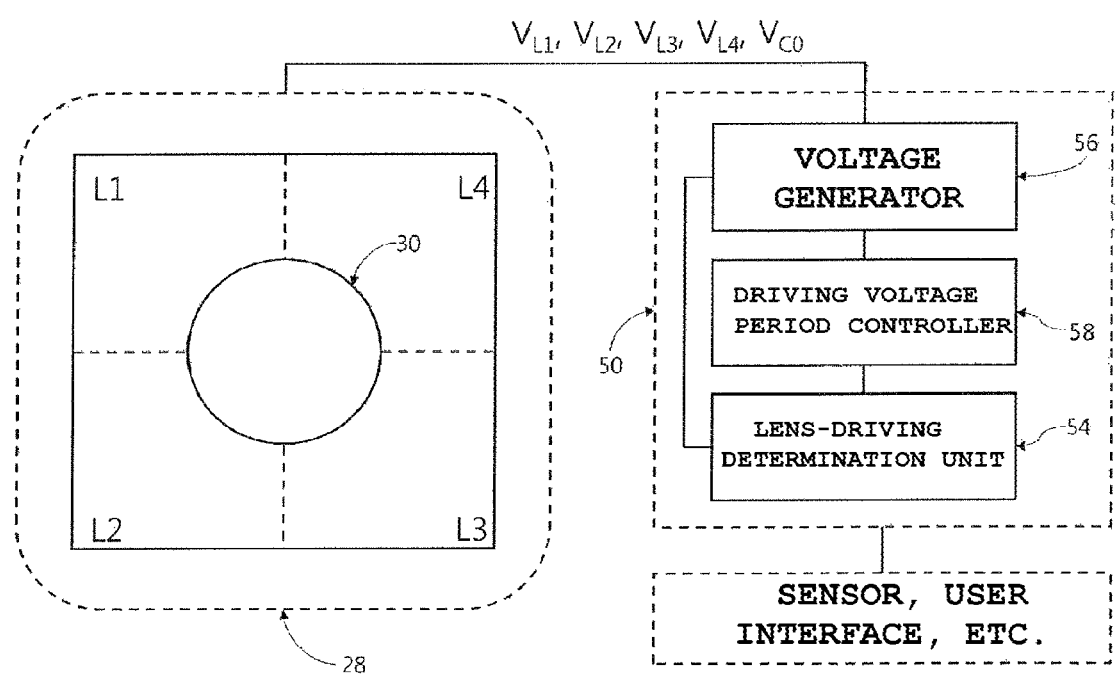

[FIG. 13]
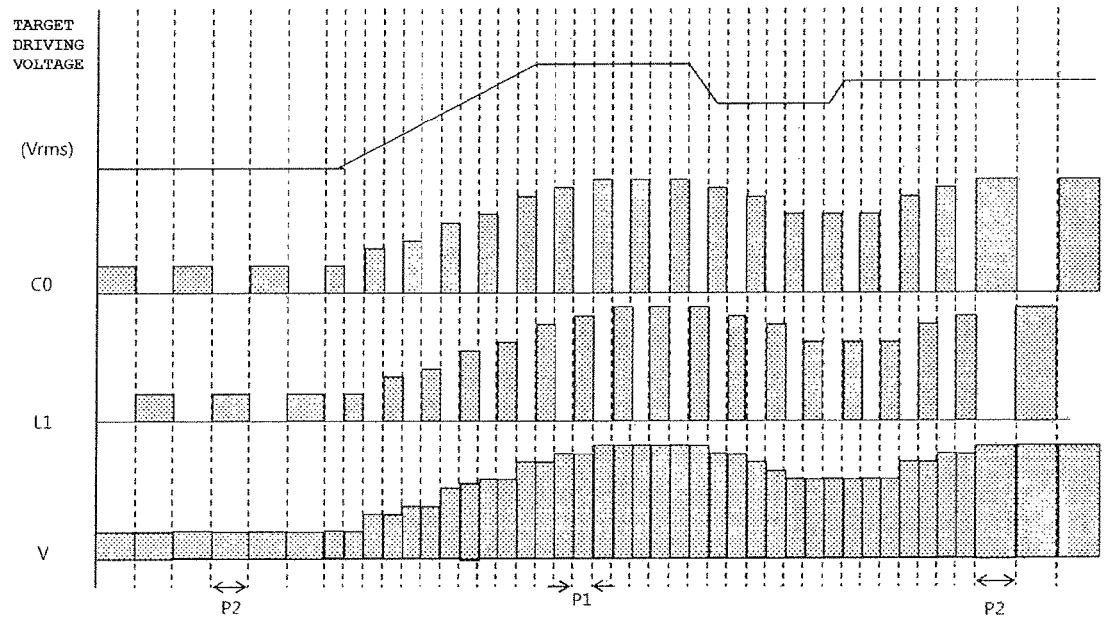
[FIG. 14]
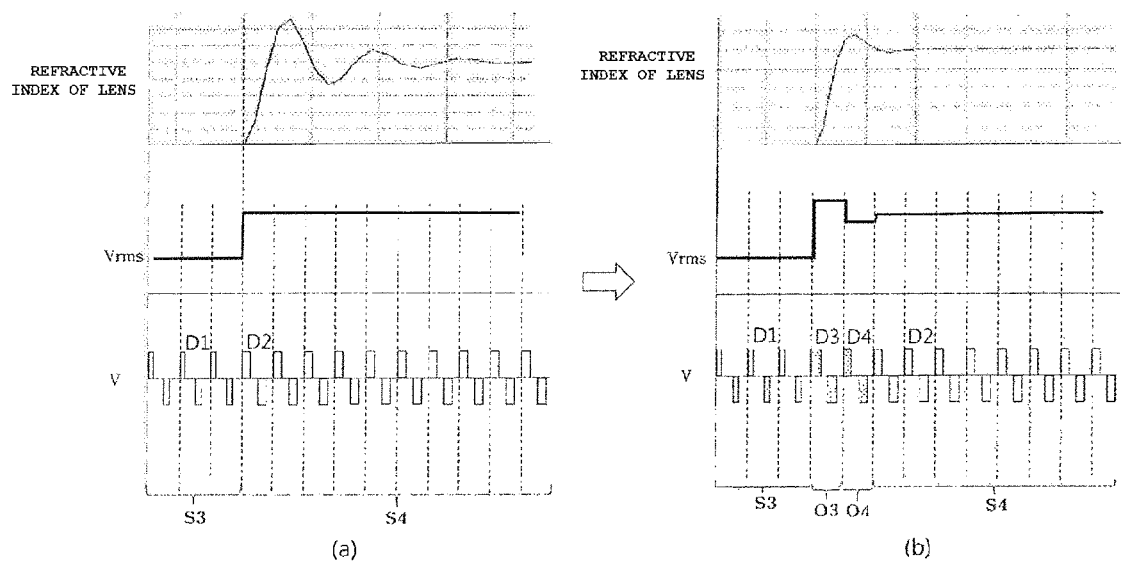

[FIG. 15]
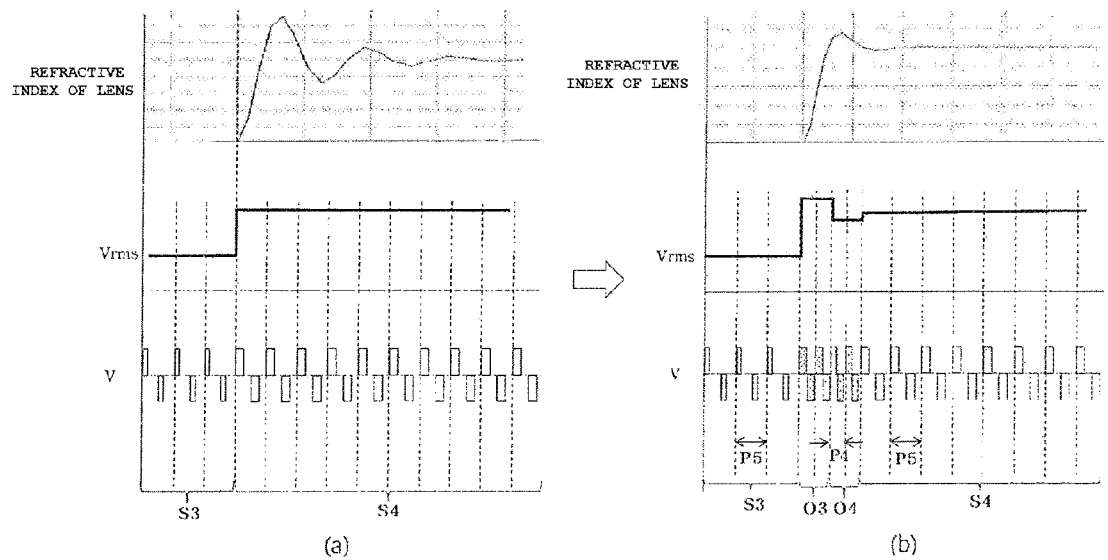
[FIG. 16]
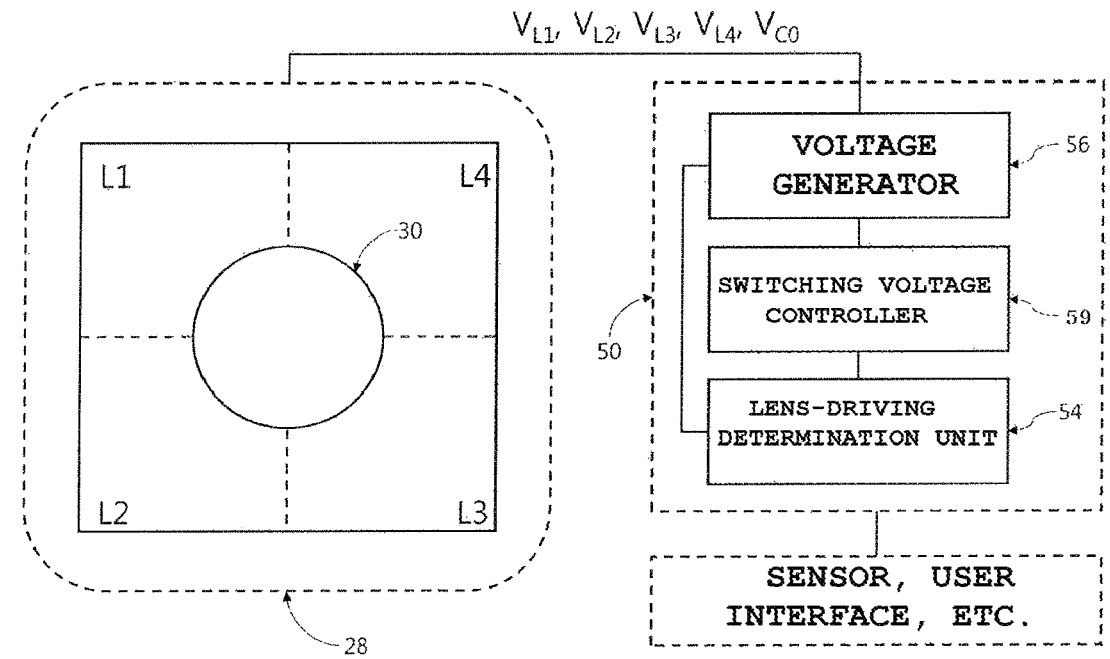

【FIG. 17a】
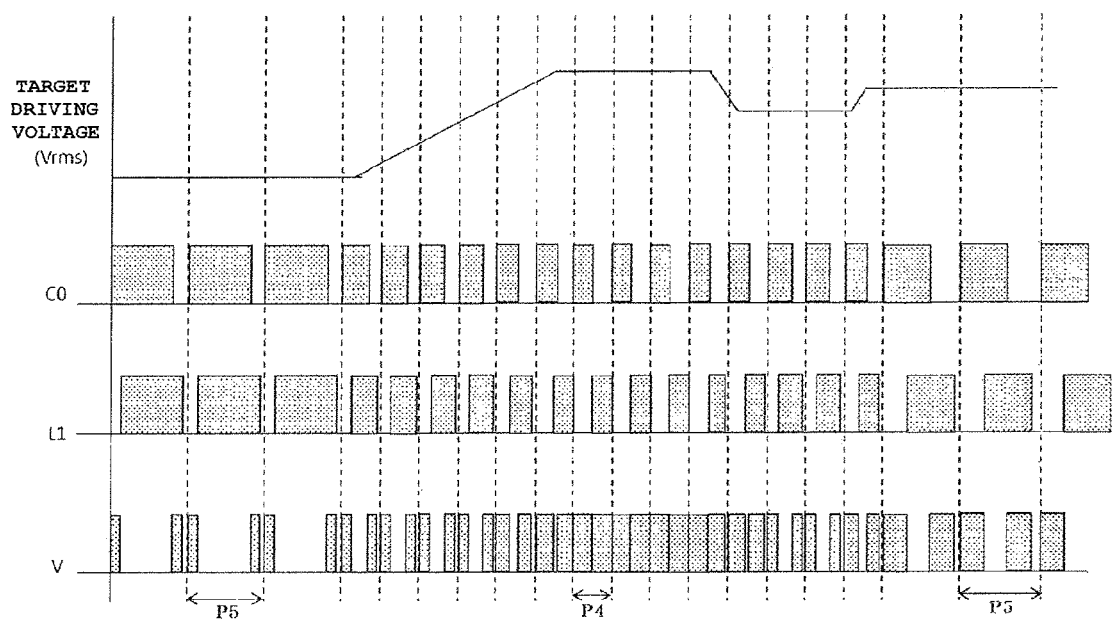
【FIG. 17b】
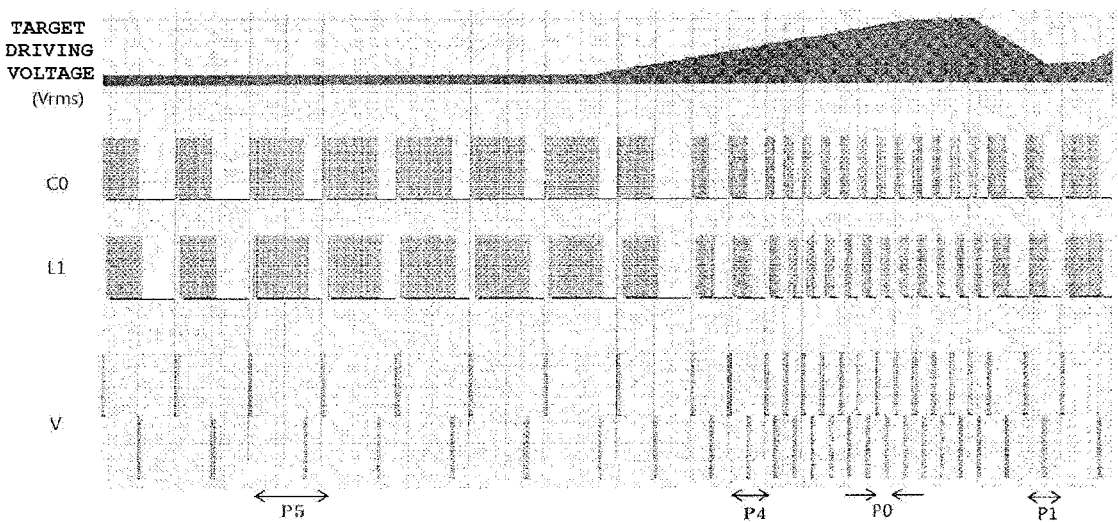

[FIG. 18]
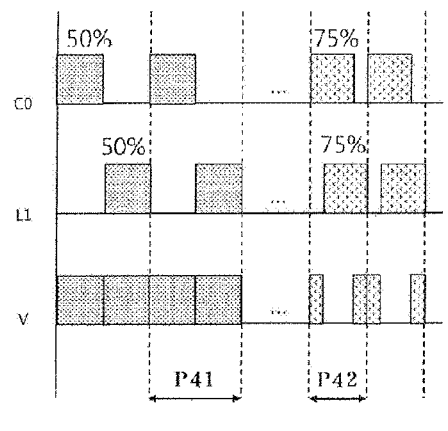
(a)
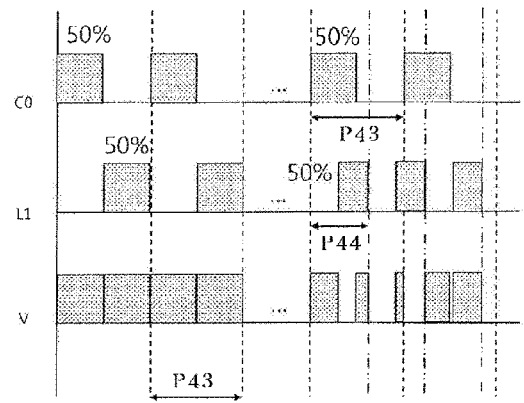
(b)

CIRCUIT FOR CONTROLLING LIQUID LENS

CROSS REFERENCE TO RELATED APPLICATIONS

This application is the National Phase of PCT International Application No. PCT/KR2018/004222, filed on Apr. 11, 2018, which claims priority under 35 U.S.C. 119(a) to Patent Application Nos. 10-2017-0046967, 10-2017-0046975, and 10-2017-0046976, all filed in the Republic of Korea on Apr. 11, 2017, all of which are hereby expressly incorporated by reference into the present application.

TECHNICAL FIELD

Embodiments relate to a liquid lens, a camera module including the same, and an optical device. More particularly, embodiments relate to a camera module and an optical device, which include a liquid lens control module, a circuit for controlling a liquid lens, or a liquid lens control circuit to control a liquid lens enabling adjustment of a focal length using electrical energy.

BACKGROUND ART

People who use portable devices demand optical devices that have high resolution, are small, and have various photographing functions. Examples of various photographing functions may include an autofocus (AF) function, a hand-tremor compensation or optical image stabilization (OIS) function, and the like.

The above photographing functions may be realized by directly moving a plurality of lenses that are combined. In the case in which the number of lenses is increased, however, the size of an optical device may be increased. The AF function and the OIS function are performed by moving or tilting several lens modules, which are fixed to a lens holder so as to be aligned with the optical axis, along the optical axis or in a direction perpendicular to the optical axis, and a separate lens-moving apparatus is used to move the lens modules. However, the lens-moving apparatus consumes a lot of power and increases the overall thickness. Therefore, research has been conducted on a liquid lens configured to electrically adjust the curvature of an interface between two liquids in order to perform the AF function and the OIS function.

DISCLOSURE

Technical Problem

Embodiments may provide, in a camera module including a liquid lens enabling adjustment of a focal length using electrical energy, a device and method for stabilizing movement of an interface in the liquid lens by sequentially or gradually supplying voltages for driving the liquid lens to a plurality of individual electrodes.

In addition, embodiments may shorten the time taken until an interface in a liquid lens is stabilized due to free and flexible movement of the interface in the process of controlling the interface by sequentially applying electrical energy to a plurality of individual electrodes of the liquid lens, thereby shortening the operation time taken for movement of a focal point of a camera module or an optical device including the liquid lens.

In addition, embodiments may provide, in a camera module including a liquid lens enabling adjustment of a focal length using electrical energy, a device and method for stabilizing movement of an interface in the liquid lens by controlling a voltage pulse for driving the liquid lens and supplying the voltage pulse to a plurality of individual electrodes.

In addition, embodiments may provide a device and method for increasing the operation speed of a liquid lens by adjusting a pulse period of a driving voltage depending on the state of the liquid lens (e.g. depending on whether there is a change in diopter) in order to control the pulse-type driving voltage applied to the liquid lens.

In addition, embodiments may provide a device and method for reducing load of a switching circuit by adjusting a pulse period of a driving voltage while controlling a liquid lens and thus reducing power consumption of a control circuit of the liquid lens.

However, the objects to be accomplished by the disclosure are not limited to the above-mentioned objects, and other objects not mentioned herein will be clearly understood by those skilled in the art from the following description.

Technical Solution

In one embodiment, a control circuit of a liquid lens may include a liquid lens including a common electrode and a plurality of individual electrodes, a voltage generator configured to supply a voltage to the plurality of individual electrodes and the common electrode in the liquid lens, and a controller configured to control timing to sequentially supply the voltage to each of the plurality of individual electrodes.

In addition, the plurality of individual electrodes may include a first individual electrode, a second individual electrode, a third individual electrode, and a fourth individual electrode. The controller may apply the voltage to the second individual electrode after applying the voltage to the first individual electrode, may apply the voltage to the third individual electrode after applying the voltage to the second individual electrode, and may apply the voltage to the fourth individual electrode after applying the voltage to the third individual electrode.

In addition, the first individual electrode and the second individual electrode may be disposed at positions symmetrical to each other with respect to a center portion of the liquid lens.

In addition, the controller may sequentially apply the voltage to each of the plurality of individual electrodes at predetermined time intervals.

In addition, the timing may be an integer multiple of a period of the voltage.

In addition, the controller may apply the voltage to the first individual electrode to the fourth individual electrode in order from high voltage to low voltage.

In another embodiment, a control circuit of a liquid lens may include a liquid lens including a common electrode and a plurality of individual electrodes, a voltage generator configured to control the magnitude of an input voltage and generate an output voltage, and a voltage period controller configured to control the period of a voltage supplied to the common electrode and the plurality of individual electrodes using the output voltage of the voltage generator.

In addition, when a voltage applied to at least one of the common electrode or the plurality of individual electrodes is changed, the period of the voltage may include a section in which the period switches from a predetermined first period to a second period, the second period being shorter than the first period.

In addition, the period of the voltage may include a section in which switching to the first period is performed after the section in which switching to the second period is performed.

In addition, the amplitude of a voltage in the section in which the period of the voltage is the second period may include a first amplitude and a second amplitude, the first amplitude and the second amplitude being different from each other.

In addition, the amplitude in the section in which switching to the first period is performed after the section in which switching to the second period is performed may be between the first amplitude and the second amplitude.

In addition, the amplitude of a voltage applied to any one of the plurality of individual electrodes and the amplitude of a voltage applied to the common electrode may correspond to each other.

In a further embodiment, a control circuit of a liquid lens may include a liquid lens including a common electrode and a plurality of individual electrodes, and a voltage generator configured to generate a driving voltage to drive the liquid lens. When the amplitude of a driving voltage applied between the common electrode and one of the plurality of individual electrodes changes from a first amplitude to a second amplitude, the driving voltage may include a first section in which the amplitude of the driving voltage increases and a second section in which the amplitude of the driving voltage decreases, and the second amplitude may be between the maximum amplitude in the first section and the minimum amplitude in the second section.

In addition, the period of a voltage in the first section and the second section may be shorter than the period of a driving voltage applied at the first amplitude and the second amplitude.

In addition, when the first amplitude is smaller than the second amplitude, the maximum amplitude in the first section may be 130% or more of the second amplitude, and the minimum amplitude in the second section may be 85% or less of the second amplitude.

In still another embodiment, a control circuit of a liquid lens may include a liquid lens including a common electrode and a plurality of individual electrodes, and a voltage generator configured to generate a driving voltage to drive the liquid lens. When the Vrms value of a driving voltage applied between the common electrode and one of the plurality of individual electrodes changes from a first Vrms value to a second Vrms value, the driving voltage may include a first section in which the duty ratio of the driving voltage is changed and a second section having a duty ratio different from the duty ratio in the first section, and the duty ratio in at least one of the first section or the second section may be greater than the duty ratio in a section having the second Vrms value.

In addition, when the second Vrms value is greater than the first Vrms value, the duty ratio in the section having the second Vrms value may be smaller than the duty ratio in the first section.

In addition, when the second Vrms value is greater than the first Vrms value, the duty ratio in the section having the second Vrms value may be greater than the duty ratio in the section having the first Vrms value.

In addition, when the first Vrms value is greater than the second Vrms value, the duty ratio in the section having the second Vrms value may be greater than the duty ratio in the first section.

In addition, when the second Vrms value is smaller than the first Vrms value, the duty ratio in the section having the second Vrms value may be smaller than the duty ratio in the section having the first Vrms value.

In addition, the height and the period of the pulse of the driving voltage may be uniform.

In addition, the first section may have a third Vrms value, the second section may have a fourth Vrms value, and the Vrms values may meet the following requirements: third Vrms value>second Vrms value>fourth Vrms value>first Vrms value.

In addition, the first section may have a third Vrms value, the second section may have a fourth Vrms value, and the Vrms values may meet the following requirements: first Vrms value>fourth Vrms value>second Vrms value>third Vrms value.

In addition, when a voltage applied to at least one of the common electrode or the plurality of individual electrodes is changed, the period of the driving voltage may include a section in which the period switches from a predetermined first period to a second period, the second period being shorter than the first period.

In addition, the third Vrms value may be 130% or less of the second Vrms value, and the fourth Vrms value may be 85% or less of the second Vrms value.

In addition, the width or the period of the pulse of the driving voltage may be varied.

However, the above aspects of the present disclosure are only a part of the exemplary embodiments of the present disclosure, and various embodiments based on technical features of the present disclosure may be devised and understood by those skilled in the art from the following detailed description of the present disclosure.

Advantageous Effects

The effects of a device according to embodiments will be described below.

Embodiments may reduce side effects attributable to sudden movement of the focal point of a liquid lens by sequentially applying driving voltages to a liquid lens enabling adjustment of a focal length.

In addition, embodiments may realize more stable and rapid movement of an interface through the control of a liquid lens, thus making it possible to mount the liquid lens in a camera module or an optical device that frequently undergoes a large movement.

In addition, embodiments may realize more rapid and stable movement of an interface according to sudden movement of the focal point of a liquid lens by controlling the pulse period and the amplitude of the pulse of the driving voltages of the liquid lens enabling adjustment of a focal length and by applying the driving voltages to a plurality of individual electrodes.

In addition, embodiments may realize more rapid and stable movement of an interface according to sudden movement of the focal point of a liquid lens by controlling the duty ratio of the pulse of driving voltages of the liquid lens enabling adjustment of a focal length and by applying an overshooting voltage and an undershooting voltage to a plurality of individual electrodes when the driving voltages are changed.

However, the effects achievable through the disclosure are not limited to the above-mentioned effects, and other effects not mentioned herein will be clearly understood by those skilled in the art from the following description.

DESCRIPTION OF DRAWINGS

FIG. 1 is a view showing an example of a camera module.

FIG. 2 is a cross-sectional view exemplarily showing a lens assembly included in the camera module.

FIGS. 3(a) and (b) are, respectively, a perspective view and an equivalent circuit of a liquid lens, the focal length of which is adjusted in response to driving voltages.

FIG. 4 is a cross-sectional view exemplarily showing the liquid lens.

FIGS. 5(a) and (b) are views for explaining a lens correction method of the liquid lens.

FIGS. 6(a) to (c) are views for explaining a change in an interface in the liquid lens.

FIGS. 7(a) and (b) are views for explaining movement of the interface in the liquid lens.

FIG. 8 is a block diagram of a control circuit of the liquid lens according to a first embodiment.

FIGS. 9(a) and (b) are waveform diagrams for explaining driving voltages applied to the liquid lens by the control circuit of the liquid lens according to the first embodiment.

FIGS. 10(a) and (b) are views for explaining the process in which driving voltages are applied to the liquid lens in response to movement of a portable device equipped with the liquid lens.

FIG. 11 is a view for explaining a method of controlling the liquid lens through supply of an overshooting voltage.

FIG. 12 is a block diagram of a control circuit of a liquid lens according to a second embodiment.

FIG. 13 is a waveform diagram for explaining a method of driving the liquid lens according to the second embodiment.

FIGS. 14(a) and (b) are waveform diagrams for explaining a first control method of the liquid lens through supply of an overshooting voltage according to the second embodiment.

FIGS. 15(a) and (b) are waveform diagrams for explaining a second control method of the liquid lens through supply of an overshooting voltage according to the second embodiment.

FIG. 16 is a block diagram of a control circuit of a liquid lens according to a third embodiment.

FIGS. 17a and 17b are waveform diagrams for explaining a method of driving the liquid lens according to the third embodiment.

FIGS. 18(a) and (b) are waveform diagrams for explaining a method of controlling driving voltages of the liquid lens according to the third embodiment.

BEST MODE

Reference will now be made in detail to the preferred embodiments, examples of which are illustrated in the accompanying drawings. While the disclosure is subject to various modifications and alternative forms, specific embodiments thereof are shown by way of example in the drawings. However, the disclosure should not be construed as being limited to the embodiments set forth herein, but on the contrary, the disclosure covers all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element without necessarily requiring or involving any physical or logical relationship or sequence between such subjects or elements.

FIG. 1 is a view exemplarily showing a camera device (or a camera module).

As shown in FIG. 1, a camera module may include a lens assembly 22 and an image sensor 26. The camera module may further include a control circuit 24.

The lens assembly 22 may include a liquid lens, the focal length of which is adjusted in response to the voltages applied thereto. The lens assembly 22 may include a plurality of lenses, which include a first lens (or a liquid lens), the focal length of which is adjusted in response to the driving voltages applied between a common terminal and a plurality of individual terminals.

The control circuit 24 may supply driving voltages to the first lens.

The image sensor 26 may be aligned with the lens assembly 22, and may convert light transmitted through the lens assembly 22 into an electrical signal.

Referring to FIG. 1, the camera module may include a control circuit 24 and an image sensor 26, which are formed on a single printed circuit board (PCB), and a lens assembly 22, which includes a plurality of lenses. However, this is just one example, and does not limit the scope of the embodiment. The control circuit 24 may be configured differently in accordance with the specifications required for the camera module. In particular, in the case in which the magnitudes of voltages applied to the liquid lens are reduced, the control circuit 24 may be implemented as a single chip. As a result, it is possible to further reduce the size of the camera module that is mounted in a portable device.

FIG. 2 is a cross-sectional view exemplarily showing the lens assembly 22 included in the camera device (or the camera module).

As shown in FIG. 2, the lens assembly 22 may include a first lens unit 100, a second lens unit 200, a liquid lens unit 300, a lens holder 400, and a connection unit 500.

The connection unit 500 may electrically connect the image sensor 26 and the liquid lens to each other, and may include a board, a wire, or a cable, which will be described later. The illustrated structure of the lens assembly 22 is just one example, and the structure of the lens assembly 22 may be changed depending on the specifications required for the camera module. For example, in the embodiment shown in FIG. 2, the liquid lens unit 300 is disposed between the first lens unit 100 and the second lens unit 200. However, in another embodiment, the liquid lens unit 300 may be disposed on the first lens unit 100 (or on the front surface of the first lens unit), and at least one of the first lens unit 100 or the second lens unit 200 may be omitted. In particular, in the case in which the magnitudes of the operating voltages applied to the lens assembly 22 are reduced, the control circuit 24 may be implemented as a single chip. As a result, it is possible to further reduce the size of the camera device that is mounted in a portable device.

Referring still to FIG. 2, the first lens unit 100 is disposed at the front side of the lens assembly 22, and receives light incident from outside the lens assembly 22. The first lens unit 100 may include at least one lens, or two or more lenses may be aligned along a center axis PL to form an optical system.

The first lens unit 100 and the second lens unit 200 may be mounted in the lens holder 400. Here, a plurality of through-holes may be formed in the lens holder 400, and the first lens unit 100 and the second lens unit 200 may be disposed in respective ones among the plurality of through-holes. Further, the liquid lens unit 300 may be inserted into the space between the first lens unit 100 and the second lens unit 200 in the lens holder 400.

Meanwhile, the first lens unit 100 may include a solid lens 110. The solid lens 110 may protrude outside the lens holder 400 and may be exposed outside. Due to the exposure of the solid lens 110 to the outside, the surface of the lens may be damaged. If the surface of the lens is damaged, the quality of an image captured by the camera module may be deteriorated. In order to prevent or minimize damage to the surface of the solid lens 110, a method of placing a cover glass, a method of forming a coating layer, or a method of forming the solid lens 100 using a wear-resistant material for preventing damage to the surface may be applied.

The second lens unit 200 may be disposed at the rear of the first lens unit 100 and the liquid lens unit 300, and the light incident on the first lens unit 100 from the outside may pass through the liquid lens unit 300 and may be incident on the second lens unit 200. The second lens unit 200 may be spaced apart from the first lens unit 100 and may be disposed in the through-hole formed in the lens holder 400.

The second lens unit 200 may include at least one lens, and when two or more lenses are included, the lenses may be aligned along the center axis PL to form an optical system.

Meanwhile, the liquid lens unit 300 may be disposed between the first lens unit 100 and the second lens unit 200, and may be inserted into an insertion hole 410 formed in the lens holder 400. The insertion hole 410 may be formed such that a portion of the side surface of the lens holder 400 is open. That is, the liquid lens unit 300 may be inserted and disposed in the lens holder 400 through the insertion hole 410 formed in the side surface of the lens holder 400. The liquid lens unit 300 may be aligned along the center axis PL together with the first lens unit 100 and the second lens unit 200.

The liquid lens unit 300 may include a lens region 310. The lens region 310 may be a region that light that has passed through the first lens unit 100 penetrates, and may contain a liquid in at least a portion thereof. In an example, two kinds of liquid, i.e. a conductive liquid and a non-conductive liquid, may be disposed together in the lens region 310, and the conductive liquid and the non-conductive liquid may form an interface therebetween without mixing with each other. The interface between the conductive liquid and the non-conductive liquid may be deformed by the driving voltages applied thereto through the connection unit 500, whereby the curvature of the interface of the liquid lens or the focal length of the liquid lens may be changed. When deformation of the interface and the change in the curvature thereof are controlled, the liquid lens unit 300 and the camera module including the same may perform an autofocus function, a hand-tremor compensation function, etc.

FIGS. 3(a) and (b) are views for explaining a liquid lens, the focal length of which is adjusted in response to driving voltages. Specifically, FIG. 3(a) illustrates a first lens 28 (or a liquid lens) included in the lens assembly 22 (refer to FIG. 2), and FIG. 3(b) illustrates an equivalent circuit of the first lens 28.

First, referring to FIG. 3(a), the liquid lens 28, the focal length of which is adjusted in response to driving voltages, may receive voltages through individual terminals L1, L2, L3 and L4, which are disposed at the same angular interval from each other in four different directions. The individual terminals may be disposed at the same angular interval from each other with respect to the center axis of the liquid lens 28, and may include four individual terminals. The four individual terminals may be disposed at the four corners of the liquid lens 28, respectively. When voltages are applied through the individual terminals L1, L2, L3 and L4, the interface between the conductive liquid and the non-conductive liquid disposed in the lens region 310 may be deformed by the driving voltages, which are formed by the interaction between the voltages applied to the individual terminals and the voltage applied to a common terminal C0, which will be described later.

In addition, referring to FIG. 3(b), the liquid lens 28 may be constituted by a plurality of capacitors 30, one side of each of which receives an operating voltage from a corresponding one of the respectively different individual terminals L1, L2, L3 and L4, and the other side of each of which is connected to the common terminal C0. Here, the plurality of capacitors 30 included in the equivalent circuit may have a low capacitance of about several tens to 200 picofarads (pF). In the present specification, the above-described terminals of the liquid lens 28 may be referred to as electrode sectors or sub-electrodes.

FIG. 4 is a cross-sectional view exemplarily showing the liquid lens 28.

As shown in FIG. 4, the liquid lens 28 may include liquids, a first plate 114, and electrodes. The liquids 122 and 124 included in the liquid lens 28 may include a conductive liquid and a non-conductive liquid. The first plate 114 may include a cavity 150 or a hole in which the conductive liquid and the non-conductive liquid are disposed. The cavity 150 may include an inclined surface. The electrodes 132 and 134 may be disposed on the first plate 114. That is, the electrodes 132 and 134 may be disposed on at least one of the upper portion or the lower portion of the first plate 114. The liquid lens 28 may further include a second plate 112, which may be disposed on the electrodes 132 and 134 (e.g. on the upper portions or the lower portions of the electrodes). In addition, the liquid lens may further include a third plate 116, which may be disposed on the electrodes 132 and 134 (e.g. on the lower portions or the upper portions of the electrodes).

As shown in FIG. 4, one embodiment of the liquid lens 28 may include an interface 130 formed by two different liquids 122 and 124. In addition, the connection unit 500 may include at least one board 142 and 144 for supplying voltages to the liquid lens 28. The corners of the liquid lens 28 may be thinner than the center portion of the liquid lens 28. The second plate 112 may be disposed on the upper surface of the liquid lens 28, and the third plate 116 may be disposed on the lower surface of the liquid lens 28. However, the second plate 112 or the third plate 116 may not be disposed on a portion of the upper surface or the lower surface of the corners of the liquid lens 28, and thus the corners of the liquid lens 28 may be thinner than the center portion of the liquid lens 28. The electrodes may be exposed on the upper surface or the lower surface of the corners of the liquid lens 28.

The liquid lens 28 may include two different liquids, namely the conductive liquid 122 and the non-conductive liquid 124, and the curvature and the shape of the interface 130 formed by the two liquids may be adjusted by varying the driving voltages supplied to the liquid lens 28. The driving voltages supplied to the liquid lens 28 may be transmitted through the connection unit 500. The connection unit 500 may include at least one of the first board 142 or the second board 144. In the case in which the connection unit 500 includes the first board 142 and the second board 144, the second board 144 may serve to transmit a voltage to each of the individual terminals, and the first board 142 may serve to transmit a voltage to the common terminal. The number of individual terminals may be four, and the second board 144 may transmit a voltage to each of the four individual terminals. The voltages supplied through the second board 144 and the first board 142 may be applied to a plurality of electrodes 134 and 132 disposed or exposed at the respective corners of the liquid lens 28.

In addition, the liquid lens 28 may include a third plate 116 and a second plate 112, which include a transparent material, and may further include a first plate 114, which is disposed between the third plate 116 and the second plate 112 and includes an open region having a predetermined inclined surface.

In addition, the liquid lens 28 may include a cavity 150, which is defined by the third plate 116, the second plate 112, and the open region in the first plate 114. Here, the cavity 150 may be filled with two liquids 122 and 124 having different properties (e.g. a conductive liquid and a non-conductive liquid), and an interface 130 may be formed between the two liquids 122 and 124 having different properties.

In addition, at least one of the two liquids 122 and 124 included in the liquid lens 28 may be conductive, and the liquid lens 28 may include two electrodes 132 and 134, which are disposed on and under the first plate 114. The first plate 114 may include an inclined surface, and may further include an insulation layer 118, which is disposed on the inclined surface. The conductive liquid may be in contact with the insulation layer 118. Here, the insulation layer 118 may cover one (e.g. the second electrode 134) of the two electrodes 132 and 134, and may cover or expose a portion of the other one (e.g. the first electrode 132) of the two electrodes 132 and 134 so that electrical energy is applied to the conductive liquid (e.g. 122). Here, the first electrode 132 may include at least one electrode sector (e.g. C0 in FIG. 3(b)), and the second electrode 134 may include two or more electrode sectors (e.g. L1, L2, L3 and L4 in FIG. 3). In an example, the second electrode 134 may include a plurality of electrode sectors, which are sequentially disposed in the clockwise direction about the optical axis. The electrode sectors may be referred to as sub-electrodes or terminals of the liquid lens.

One or two or more boards 142 and 144 may be connected to the two electrodes 132 and 134 included in the liquid lens 28 in order to transmit voltages thereto. The curvature, flexure, or inclination of the interface 130 formed in the liquid lens 28 may be changed in response to the driving voltages, whereby the focal length of the liquid lens 28 may be adjusted.

FIGS. 5(a) and (b) are views for explaining a lens correction method of the liquid lens.

First, referring to FIG. 5(a), a user who uses a camera function of a portable terminal or a portable device may move the portable terminal or the portable device in any specific direction (e.g. the direction indicated by the arrow 32). The movement of the portable terminal or the portable device in any specific direction by the user may be a movement that is intended by the user, or may be a movement that is not intended by the user, such as a hand tremor or the like.

Referring to FIG. 5(b), the liquid lens 28 mounted in the portable terminal or in the portable device may move to substantially the same extent to which the user intentionally or unintentionally moves the portable terminal or the portable device (e.g. in the direction indicated by the arrow 32). This is because the liquid lens 28 is fixedly mounted in the portable terminal or the portable device via various structures, devices, elements, or the like. Since the liquid lens 28 also moves in accordance with the movement of the portable terminal or the portable device, when an image is received based on an optical signal received through the liquid lens 28, compensation for the movement is required. For example, if the liquid lens 28 has a movement (e.g. in the direction indicated by the arrow 32) equal to the movement of the portable terminal or the portable device, the interface located at the lens region 310 in the liquid lens 28 needs to correct the received optical signal in the reverse direction (e.g. the direction indicated by the arrow 34) in order to compensate for the movement of the liquid lens 28.

FIGS. 6(a) to (c) illustrate the change in the interface in the liquid lens 28. Specifically, FIGS. 6(a) to (c) are views for explaining the movement of the interface 30a, 30b and 30c, which may occur when voltages are applied to the individual electrodes L1, L2, L3 and L4 of the liquid lens 28.

First, referring to FIG. 6(a), when voltages having substantially the same magnitude are applied to the individual electrodes L1, L2, L3 and L4 of the liquid lens 28, the interface 30a may maintain an approximately circular shape. When viewed from the top, the horizontal length LH of the interface and the vertical length LV of the interface may be substantially the same, and movement (e.g. the inclination angle) of the interface 30a may be realized in a balanced manner. In this case, the capacitance values of the interface 30a, which are measured through the four different individual electrodes L1, L2, L3 and L4, may be substantially the same.

In addition, the case in which the voltages applied to the first to fourth individual electrodes L1 to L4 of the liquid lens 28 are lower than those in the case shown in FIG. 6(a) will be described with reference to FIG. 6(b). In this case, the inclination of the interface 30b increases. Accordingly, when viewed from the top, the interface 30b may be shaped such that the horizontal length LH and the vertical length LV thereof become greater than those of the interface 30a shown in FIG. 6(a).

In addition, referring to FIG. 6(c), in the case in which the voltages applied to the first individual electrode L1 and the third individual electrode L3 of the liquid lens 28 differ from the voltages applied to the second individual electrode L2 and the fourth individual electrode L4, the interface may be shaped such that the vertical length LV is shorter than the horizontal length LH when viewed from the top. Similar to the case shown in FIG. 6(b), the capacitance values of the interface 30c, which are measured through the four different individual electrodes L1, L2, L3 and L4, may be different from each other. Meanwhile, since the interface 30c is symmetrically changed, the capacitance values of the interface 30c, which are measured through the four different individual electrodes L1, L2, L3 and L4, may be symmetrical. In this case, the capacitance values of L1 and L3 may be the same, and the capacitance values of L2 and L4 may be the same.

In addition, the capacitance values measured at the interfaces 30a, 30b and 30c shown in FIGS. 6(a), 6(b) and 6(c) differ from each other. It is possible to directly and more accurately measure the changes in the movement of the interfaces 30a, 30b and 30c relative to the previous movement thereof depending on the voltages applied to the first to fourth individual electrodes L1 to L4 using the difference in the capacitance values.

Meanwhile, although the structure in which the liquid lens 28 includes four individual electrodes has been described by way of example in the above embodiment, the liquid lens 28 may include a larger number of individual electrodes, e.g. eight, twelve, sixteen, or more, and feedback electrodes corresponding thereto. In this case, the movement of the liquid lens 28 may be more precisely controlled, and the corresponding movement may be more accurately measured.

FIRST EMBODIMENT

FIG. 7 illustrates the movement of the interface in the liquid lens.

As shown in FIG. 7, the interface in the liquid lens is formed between two liquids. The movement of the interface, which is formed between two free-moving liquids, may also be very free and flexible.

As described with reference to FIG. 5, the movement of a portable terminal or a portable device may occur in three-dimensional space, and a compensation value for compensating for this movement may also be determined corresponding to three-dimensional spatial coordinates (e.g. an x axis, a y axis, and a z axis). A compensation value corresponding to three-dimensional spatial coordinates may appear as a change in the diopter of the liquid lens. The change in the diopter may be determined according to the performance of the liquid lens. It may be predicted that the interface moves according to the variation in the diopter along the three-dimensional spatial axes with respect to the center axis of the liquid lens within the same range or respectively different ranges along the axes of the three-dimensional spatial coordinates.

The interface in the liquid lens may move very flexibly and freely. Thus, in the case in which a large change occurs in any specific direction from the state shown in FIG. 7(a) to the state shown in FIG. 7(b), the interface in the liquid lens may move so as to have a desired shape within a short period of time due to the flexible and free movement characteristics thereof. However, rapid movement of the interface may cause the interface to roll. When driving voltages are applied through individual electrodes and a common electrode disposed in the liquid lens, the two liquids in the liquid lens may be influenced by electrical energy due to the driving voltages, and movement of the interface may occur. When a force having a predetermined magnitude or greater is instantaneously applied to the liquids in a specific direction, the interface may make an undulating movement. When the undulation naturally dissipates, it may be assumed that the interface of the liquid lens is ready to perform normal operation. In another example for better understanding, when all four corners of a thin sheet of paper placed on a table are lifted at once, the paper may flap. However, when the four corners of a piece of paper are sequentially lifted one by one, flapping of the paper may be reduced.

In order to prevent such a phenomenon, when a compensation value that needs to be compensated for through the movement and shape of the interface in the liquid lens is determined, driving voltages are sequentially applied to individual electrodes and a common electrode in the liquid lens according to the compensation value, rather than being applied at once, so that sudden forces are sequentially transmitted to the interface in the liquid lens. When electrical energy is sequentially transmitted to the interface in the liquid lens, an undulation phenomenon or the like of the interface may be reduced, thereby shortening the time taken until the liquid lens operates normally using the compensation value.

FIG. 8 is a block diagram of the control circuit of the liquid lens according to a first embodiment.

As shown in FIG. 8, the interface 30 of the liquid lens 28 may be controlled in response to the driving voltages that are formed by voltages VL1, VL2, VL3 and VL4 transmitted to the plurality of electrode sectors L1, L2, L3 and L4 and a voltage VC0 transmitted to the common electrode C0. A change in the position, movement, or shape of the interface 30 in the liquid lens 28 may occur due to the voltage difference between the first to fourth voltages VL1, VL2, VL3 and VL4 applied to the first to fourth individual electrodes L1, L2, L3 and L4 and the voltage VC0 applied to the common electrode C0.

The driving voltages and the common voltage VL1, VL2, VL3, VL4 and VC0 may be applied from the control circuit 50 of the liquid lens. The control circuit 50 of the liquid lens may control variation in the diopter of the interface in the liquid lens 28, or may control the voltages applied to the plurality of individual electrodes L1, L2, L3 and L4 and the common electrode C0 (refer to FIG. 3) in the liquid lens 28 in order to change the diopter. In addition, the control circuit 50 of the liquid lens may set and control a switching section in the process in which voltages are applied to the plurality of individual electrodes L1, L2, L3 and L4 and the common electrode C0 to change the driving voltages.

The control circuit 50 of the liquid lens may include a lens-driving determination unit 54 for determining the change in the diopter of the interface 30 of the liquid lens 28, a voltage generator 56 for determining changes in the driving voltages to be applied to the plurality of individual electrode sectors L1, L2, L3 and L4 and the common electrode sector C0 in the liquid lens 28, and a timing controller 52 for determining the time point at which the changes in the driving voltages are to be applied to the plurality of individual electrode sectors L1, L2, L3 and L4 and the common electrode sector C0 in response to the change in the diopter. The control circuit 50 of the liquid lens may receive information about the movement of the liquid lens 28 from various sensors (e.g. a gyro sensor or the like) included in the device in which the liquid lens is mounted. In addition, when the diopter of the liquid lens 28 is changed by user input through a user interface or the like, information corresponding to the input may be transmitted to the control circuit 50 of the liquid lens.

When a compensation value based on which compensation is to be performed through the movement of the interface 30 in the liquid lens 28 is determined, in the process of applying the changes in the voltages VL1, VL2, VL3, VL4 and VC0 corresponding thereto to the plurality of individual electrodes L1, L2, L3 and L4 and the common electrode C0 in the liquid lens 28, the changes in the driving voltages VL1, VL2, VL3, VL4 and VC0 may be applied all at once, that is, at the same time, thus causing the interface 30 to undulate or roll. In order to reduce or mitigate the undulation phenomenon of the interface, the timing controller 52 may sequentially apply the changes in the voltages VL1, VL2, VL3, VL4 and VC0 to the plurality of individual electrode sectors L1, L2, L3 and L4 and the common electrode sector C0.

For example, in the case in which the driving voltages VL1, VL2, VL3 and VL4 to be applied to the first to fourth individual electrode sectors L1, L2, L3 and L4 are changed from 40 V to 50 V, the driving voltages to be applied to the first to fourth electrode sectors L1, L2, L3 and L4 may not be adjusted from 40 V to 50 V all at once, but may be sequentially changed by the timing controller 52 such that the first driving voltage VL1 to be supplied to the first individual electrode sector L1 is first changed from 40 V to 50 V, the second driving voltage VL2 to be supplied to the second individual electrode sector L2 is then changed from 40 V to 50 V, and thereafter the third driving voltage VL3 and the fourth driving voltage VL4 are sequentially changed.

FIGS. 9(a) and (b) are waveform diagrams for explaining the driving voltages applied to the liquid lens 28 by the control circuit of the liquid lens according to the first embodiment.

Specifically, FIG. 9(a) illustrates an exemplary method of simultaneously applying the changes in the driving voltages to the individual electrode sectors in the liquid lens 28, and FIG. 9(b) illustrates an exemplary method of sequentially applying the changes in the driving voltages to the individual electrode sectors in the liquid lens 28.

First, referring to FIG. 9(a), in the state in which driving voltages of 30 V have been applied to the four individual electrode sectors L1, L2, L3 and L4, driving voltages of 40 V are simultaneously applied to all of the four individual electrode sectors L1, L2, L3 and L4. The movement of the interface formed between two liquids is determined by the driving voltages applied to the four individual electrode sectors L1, L2, L3 and L4. The simultaneous occurrence of the changes in the driving voltages applied to the four individual electrode sectors L1, L2, L3 and L4 may cause the interface to physically undergo a change in the momentum due to impact. In this process, the interface, which may freely and flexibly move, may undulate or roll. This phenomenon may continue until the energy causing the interface to undulate is transmitted to the side surface of the cavity 150, thus dissipating or disappearing. This phenomenon may be avoided if the amount of electrical energy applied to the interface is changed gradually.

According to the embodiment, referring to FIG. 9(b), in the state in which driving voltages of 30 V are applied to the four individual electrode sectors L1, L2, L3 and L4, driving voltages of 40 V are applied to the four individual electrode sectors L1, L2, L3 and L4 sequentially, i.e. at time intervals. First, 40 V may be applied only to the first individual electrode sector L1, and the other individual electrode sectors L2, L3 and L4 may be maintained at 30 V. Thereafter, 40 V may be applied to the first individual electrode sector L1 and the second individual electrode sector L2, and the other individual electrode sectors L3 and L4 may be maintained at 30 V. In this manner, if the driving voltages applied to the respective individual electrode sectors are sequentially changed one by one, the impact applied to the interface of the liquid lens 28 by the electrical energy applied thereto may be reduced, thereby avoiding the undulation or rolling phenomenon of the interface. In order to sequentially change the driving voltages applied to the respective individual electrode sectors, the control circuit 50 of the liquid lens may include the timing controller 52 (refer to FIG. 8).

The case in which the driving voltages to be applied to the four individual electrode sectors L1, L2, L3 and L4 are changed has been described with reference to FIG. 9. However, in some embodiments, even when only the driving voltages to be applied to some of the individual electrode sectors are changed, the driving voltages may be sequentially applied thereto. In an example, in the case in which the driving voltages applied to two of the four individual electrode sectors are not changed and the driving voltages applied to the other two individual electrode sectors are changed, the changes in the driving voltages may not be applied to the other two individual electrode sectors at once, but may be sequentially applied thereto.

Meanwhile, FIG. 9(b) illustrates the case in which the driving voltages are sequentially applied to the plurality of individual electrode sectors L1, L2, L3 and L4 at every cycle without a separate time interval. However, the embodiment is not limited thereto. That is, there may be a time interval as long as at least one period from the time at which the driving voltage is applied to one individual electrode until the time at which the driving voltage is applied to the next individual electrode in response to movement that needs to be compensated for by the liquid lens 28 or depending on the embodiment. For example, the timing may be an integer multiple of the period of the driving voltage in order to sequentially supply the driving voltages to the respective individual electrodes.

The above-described liquid lens 28 may be included in a camera module or a camera device. The camera module may include a lens assembly, which includes a liquid lens mounted in a housing and at least one solid lens that may be disposed on the front surface or the rear surface of the liquid lens, an image sensor for converting an optical signal transmitted through the lens assembly into an electrical signal, and a control circuit for supplying driving voltages to the liquid lens.

Meanwhile, FIG. 9(b) conceptually illustrates the adjustment of the driving voltages through the difference between the numerical values and the difference in shape between the patterns. The shape of the waveform may vary depending on a pulse width modulation (PWM) scheme or a pulse amplitude modulation (PAM) scheme by which the driver or the control circuit actually generates the driving voltages.

FIGS. 10(a) and (b) illustrate the process in which driving voltages are applied to the liquid lens in response to the movement of a portable device equipped with the liquid lens.

As shown in FIG. 10(a), a portable terminal may undergo a movement 52 from the left to the right with respect to the x-axis. This movement 52 may be caused by hand tremor of a user or the like. In order to compensate for the movement 52 from the left to the right so that the camera module may maintain the focal point thereof, the control circuit, which receives information about the movement 52 from the gyro sensor, may apply driving voltages for compensation to the third individual electrode L3 and the fourth individual electrode L4, and thereafter may apply driving voltages for compensation to the first individual electrode L1 and the second individual electrode L2.

In contrast, the portable terminal may undergo a movement 54 from the right to the left with respect to the x-axis.

In order to compensate for the movement 54 from the right to the left so that the camera module may maintain the focal point thereof, the control circuit, which receives information about the movement 54 from the gyro sensor, may apply driving voltages for compensation to the first individual electrode L1 and the second individual electrode L2, and thereafter may apply driving voltages for compensation to the third individual electrode L3 and the fourth individual electrode L4.

As described above, when the driving voltages are adjusted and applied to the liquid lens based on the information about the movement received from the gyro sensor in order to compensate for the corresponding movement, the driving voltages may be sequentially applied to the individual electrodes in order to reduce the impact applied to the interface. In this case, the order in which the driving voltages are sequentially applied to the individual electrodes may be determined according to the corresponding movement that needs to be compensated for or the direction in which compensation is required. Depending on the embodiment or the movement that needs to be compensated for, the order in which the adjusted driving voltages are applied to the individual electrodes may be determined to be a clockwise direction, a counterclockwise direction, a direction from the left to the right (or vice versa), a direction from the top to the bottom (or vice versa), or the like.

In addition, in some embodiments, the voltages may be applied to the first to fourth individual electrodes of the liquid lens in order from high voltage to low voltage.

Depending on the embodiment or the movement that needs to be compensated for, the adjusted driving voltages may be sequentially applied to the respective individual electrodes, or may be applied to respective groups, each including two individual electrodes.

SECOND EMBODIMENT

Meanwhile, as described above with reference to FIGS. 6(a) to (c), the position, movement, or shape of the interface 30a, 30b and 30c in the liquid lens 28 may be variously changed. The change in the movement and shape of the interface 30a, 30b and 30c may be determined by the driving voltages, which are the differences between the voltages applied to the plurality of individual electrodes and the voltage applied to the common electrode. The change in the driving voltages may be applied within a short time through the control circuit or the voltage generation and supply circuit, but the change in the position, movement or shape of the interface 30a, 30b and 30c in the liquid lens 28 according to the change in the driving voltages may not be as fast as the speed at which the change in the driving voltages is applied. Therefore, in order to increase the operating speed of the camera module or the optical device including the liquid lens 28 by more rapidly controlling the change in movement and shape of the interface 30a, 30b and 30c in the liquid lens 28, a method of supplying an overshooting voltage for a predetermined period of time may be used.

FIGS. 11(a) and (b) illustrate a method of controlling the liquid lens using the supply of an overshooting voltage. Specifically, FIGS. 11(a) and (b) illustrate an example of supplying a driving voltage to the liquid lens using a pulse amplitude modulation (PAM) scheme. However, FIG. 11(a) illustrates the case of using a driving voltage pulse having a predetermined period, and FIG. 11(b) illustrates the case of controlling different periods or the change in the period of the driving voltage pulse. The control of different periods or the change in the period may be substantially the same as controlling different frequencies or changing the frequency.

First, referring to FIG. 11(a), it is assumed that the change in the refractive index of the liquid lens 28 (refer to FIGS. 3 and 4) from a first state S1 to a second state S2 is required. An effective voltage Vrms may be changed by changing the driving voltage V in order to switch from the first state S1 to the second state S2. The driving voltage V may change the amount of electrical energy that is actually transmitted through a change in a duty ratio in the predetermined period. For example, the duty ratio in the second state S2 may be greater than that in the first state S1. An effective value (e.g. a root mean square (RMS)) with respect to the driving voltage V having such a waveform may be calculated as the effective voltage Vrms. In addition, it is possible to change the amount of electrical energy that is actually transmitted through a change in the amplitude of the driving voltage V. For example, the amplitude of the driving voltage V in the second state S2 may be greater than that in the first state Sl. The refractive index of the liquid lens is changed in the first state S1 and the second state S2 in response to the change in the effective voltage Vrms.

Since the interface in the liquid lens 28, which is formed between the two liquids, is changed or moved by the change in the liquids, the refractive index of the liquid lens 28 may exhibit an unstable waveform and may then be gradually stabilized, as shown in the drawings. If the time taken until the interface in the liquid lens 28 is stabilized after inducing the movement of the interface, i.e. until the refractive index is stably changed, is shortened, the camera module or the optical device equipped with the liquid lens may operate more rapidly.

Referring to FIG. 11(b), it can be seen that the period of the driving voltage having a pulse shape is controlled differently according to the states S1, O1, O2, S2a and S2b of the liquid lens 28. For example, it is assumed that the driving voltage V may be supplied in three periods P1, P2 and P3. The three periods P1, P2 and P3 are just one example, and the period of the driving voltage V may be variously set depending on the embodiment. The second period P2 may be longer than the first period P1, and the third period P3 may be longer than the second period P2. For example, the first period P1, which is the shortest period, may be applied when there is a change in the driving voltage, and the second period P2 may be applied when the driving voltage is applied after the state is changed. In addition, the third period P3, which is the longest period, may be applied to the driving voltage that is applied in the stable state, in which the state is stable and it is determined that there is no change in the driving voltage.

First, it is assumed that the change in the driving voltage is required in the first state S1, in which the driving voltage having the second period P2 is being applied. When switching from the first state S1 to the second state S2 is required in order to increase the operation speed of the liquid lens 28, a first switching section O1 and a second switching section O2 may be present between two states (e.g. between the first state S1 and the second state S2), i.e. at the switching point of time. In the process of changing the driving voltage, the driving voltage having the first period P1, which is a short period, may be applied in the first switching section O1 and the second switching section O2. In order to cause the change in the driving voltage to be applied to the liquid lens within a short time, the first switching section O1 may be an overshooting voltage period. In the first switching section O1, a voltage having a magnitude that is higher by 30% or more than the target voltage may be applied. In addition, in order to prevent an overshooting voltage or an undershooting voltage, not falling within a normal range, from being applied to the liquid lens 28, a voltage having a magnitude that is lower by 15% or less than the target voltage may be applied in the second switching section O2, thereby reducing the application of the overshooting voltage at the initial driving stage.

In the second state S2a after the first switching section O1 and the second switching section O2, a driving voltage, which has the second period P2, which is longer than the first period P1, and falls within the target voltage range, may be applied to the liquid lens. When the process proceeds from the second state S2a, in which the target voltage is applied, to a stable state, in which no change in the driving voltage occurs, the process may enter a third state S2b. When the process proceeds from the second state S2a to the third state S2b and the driving voltage is stabilized, the driving voltage having a pulse shape may be applied in a longer period P3.

In some embodiments, the pulse period (the operating frequency) may be further segmented and varied. Respectively different pulse periods may be used depending on the case in which the driving voltage increases, the case in which the driving voltage decreases, the case in which the driving voltage is maintained at a high voltage, or the case in which the driving voltage is maintained at a low voltage.

FIG. 11(b) illustrates the case in which a first switching section O1 and a second switching section O2 are present in the process of switching from a first state S1, in which the effective voltage Vrms is low, to a second state S2, in which the effective voltage Vrms becomes high. Meanwhile, a plurality of switching sections may be included in the process of switching from the state in which the effective voltage Vrms is high to the state in which the effective voltage Vrms is low. For example, a voltage having a magnitude that is lower by 30% or less than the target voltage may be applied in the first switching section, and thereafter a voltage having a magnitude that is higher by 15% or more than the target voltage may be applied in the second switching section, thereby realizing faster movement of the interface in the liquid lens.

In addition, the period of the driving voltage V may be changed in accordance with the operation state or operation mode of the interface in the liquid lens 28. For example, a driving voltage having a short period P1 may be supplied in the first switching section O1 and the second switching section O2, and a driving voltage having a long period P3 may be supplied in a third state S2b, in which the driving voltage is stabilized. In order to increase the operation speed of the liquid lens, the frequency of the driving voltage may be increased in the first switching section O1 and the second switching section O2, thereby realizing faster response of the driving voltage to induce a change in the refractive index of the liquid lens. In addition, in a holding state, in which the liquid lens is stabilized and maintained in a specific state, the driving frequency may be lowered to thus reduce switching loss, thereby improving the overall efficiency of the control circuit.

According to the control device and method of the liquid lens, at the time point at which the magnitude of the driving voltage applied to the liquid lens is changed, particularly, when the change in the driving voltage is large, a plurality of switching sections, in which a driving voltage having a short period (i.e. a high frequency) is applied, may be set in order to realize fast operation of the liquid lens. For example, a voltage that differs in magnitude from the target voltage by 30% or more or by 30% or less may be applied in one of the plurality of switching sections, and thereafter a voltage that differs in magnitude from the target voltage by 15% or less or by 15% or more may be applied in the other switching section.

In addition, in order to determine whether the liquid lens 28 is stabilized and is in the holding state, it may be determined whether there is no change in the driving voltage during the predetermined period (e.g. whether there is no change in the effective voltage during the predetermined period). The holding state may be determined based on the period in which the control circuit of the liquid lens supplies a driving voltage. However, in some embodiments, the holding state may be determined through a user's external input operation or a control circuit of a camera module or an optical device equipped with the liquid lens. When the liquid lens is in the holding state, the control circuit of the liquid lens may improve the efficiency of the control circuit by reducing the driving frequency (i.e. increasing the period).

FIG. 12 is a view for explaining a control circuit 50 of a liquid lens according to a second embodiment.

As shown in FIG. 12, the interface 30 in the liquid lens 28 may be controlled in response to voltages VL1, VL2, VL3 and VL4 transmitted through the plurality of individual electrode sectors L1, L2, L3 and L4 and a voltage VC0 applied to the common electrode C0. When the electrode sectors sequentially located clockwise from the first electrode sector with respect to the center of the liquid lens (the optical axis or the circumference) are referred to as the second electrode sector, the third electrode sector, and the fourth electrode sector, respectively, each of the first to fourth individual electrodes L1, L2, L3 and L4 may form an electrode pair together with a corresponding one of the first to fourth electrode sectors, and the driving voltages applied to the first to fourth individual electrodes L1, L2, L3 and L4 may be referred to as first to fourth driving voltages, respectively. The change in the movement and shape of the interface 30 in the liquid lens 28 may occur due to the voltage difference between the first to fourth voltages VL1, VL2, VL3 and VL4 and the voltage VC0 applied to the common electrode C0.

The driving voltages and the common voltage VL1, VL2, VL3, VL4 and VC0 may be applied from the control circuit 50 of the liquid lens. The control circuit 50 of the liquid lens may determine the driving voltages to be applied to the plurality of individual electrode sectors L1, L2, L3 and L4 and the common electrode C0 (refer to FIG. 3) in the liquid lens 28. That is, the control circuit 50 of the liquid lens may determine the amplitudes or periods of the driving voltages. In addition, the control circuit 50 of the liquid lens may change the periods of the driving voltage applied to the plurality of individual electrode sectors L1, L2, L3 and L4 and the common electrode sector C0.

The control circuit 50 of the liquid lens may include a lens-driving determination unit 56 for determining the movement of the liquid lens 28 or the change in the diopter of the interface 30 in the liquid lens 28, a voltage generator 56 for determining the changes in the driving voltages to be applied to the plurality of individual electrodes L1, L2, L3 and L4 and the common electrode C0 in the liquid lens 28 in response to the change in the diopter, and a driving voltage period controller 58 for changing the periods of the driving voltages to be applied to the plurality of individual electrodes L1, L2, L3 and L4 and the common electrode C0. The control circuit 50 of the liquid lens may receive information about the movement of the liquid lens 28 or information about the value that needs to be compensated for by the liquid lens 28 from various sensors (e.g. a gyro sensor or the like) included in the device in which the liquid lens 28 is mounted. In addition, when the diopter of the liquid lens 28 is changed by user input through a user interface or the like, information corresponding to the input may be transmitted to the control circuit 50 of the liquid lens. Further, when the diopter is not changed by sensor input or external input, information corresponding thereto may be transmitted to the control circuit 50 of the liquid lens.

When a compensation value based on which compensation is to be performed through the movement of the interface 30 in the liquid lens 28 is determined, in the process of applying the changes in the voltages VL1, VL2, VL3, VL4 and VC0 corresponding thereto to the plurality of individual electrodes L1, L2, L3 and L4 and the common electrode C0 in the liquid lens 28, in order to control the interface 30 in the liquid lens 28 to move more rapidly according to the target voltages of the driving voltages VL1, VL2, VL3, VL4 and VC0, the voltage generator 56 may apply voltages that are higher or lower than the target voltage by a predetermined range to the plurality of individual electrodes L1, L2, L3 and L3 and the common electrode C0 during a switching section in accordance with the changes in the driving voltages VL1, VL2, VL3, VL4 and VC0.

For example, when the voltages VL1, VL2, VL3 and VL4 applied to the first to fourth individual electrodes L1, L2, L3 and L4 are changed from 30 V to 50 V, that is, when the driving voltages applied to the first to fourth electrodes L1, L2, L3 and L4 are adjusted from 30 V to 50 V, a switching section may be controlled such that a voltage that is higher by 30% or more than the target voltage of 50 V is applied and thereafter a voltage that is lower by 15% or less than the target voltage of 50 V is applied. When the first voltage VL1 is supplied to the first individual electrode L1, a voltage that is higher or lower than the target voltage by a predetermined range may be applied through the voltage generator 56.

In some embodiments, in the process in which the driving voltages supplied to the first to fourth individual electrodes L1, L2, L3 and L4 are changed, the switching sections with respect to the respective individual electrode sectors may be controlled sequentially, or may be controlled simultaneously. At the time point at which the magnitude of the voltage applied to the liquid lens 28 is changed, particularly, when the change in the driving voltage is large, the driving voltage period controller 58 may set a plurality of switching sections and may control the magnitude of the voltage applied in the switching sections in order to realize fast operation of the liquid lens. For example, depending on the change (increase or decrease) in the driving voltage, a voltage that differs in magnitude from the target voltage by 30% or more may be applied in one of the plurality of switching sections, and a voltage that differs in magnitude from the target voltage by 15% or less may be applied in the other switching section.

When the amplitude of the driving voltage applied between the common electrode and one of the plurality of individual electrodes of the liquid lens is changed from a first amplitude to a second amplitude, the driving voltage may include a first section in which the amplitude of the driving voltage increases and a second section in which the amplitude of the driving voltage decreases. In this case, the second amplitude may be between the maximum amplitude in the first section and the minimum amplitude in the second section. Meanwhile, when the first amplitude is smaller than the second amplitude, the maximum amplitude in the first section may be 130% or more of the second amplitude, and the minimum amplitude in the second section may be 85% of the second amplitude. In addition, the voltage period in the first section and the second section may be smaller than the period of the driving voltage applied at the first amplitude and the second amplitude.

In addition, the periods of the voltages VL1, VL2, VL3, VL4 and VC0 may be changed through the driving voltage period controller 58. For example, when a change in the movement or the shape of the interface 30 in the liquid lens 28 is required, the periods of the driving voltages VL1, VL2, VL3, VL4 and VC0 may be shortened. When a stable state is maintained without a change in the movement or the shape of the interface 30, the periods of the driving voltages VL1, VL2, VL3, VL4 and VC0 may be increased. The operation of the driving voltage period controller 58 may be understood through the example of changing the period of the driving voltage having a pulse shape, which has been described in connection with the control method of the liquid lens with reference to FIG. 11(b).

FIG. 13 is a waveform diagram for explaining a method of driving the liquid lens according to the second embodiment.

As shown in FIG. 13, the driving voltages supplied to the liquid lens may be applied through the common electrode C0 and the individual electrodes L1 to L4 (refer to FIG. 12). The driving voltage V having an influence on the change in the interface in the liquid lens may be substantially the same as the absolute value of the difference between the voltage applied to the common electrode C0 and the voltage applied to the individual electrode L1.

As described with reference to FIG. 11, the driving voltages may be applied through the common electrode C0 and the individual electrodes L1 to L4 using a pulse amplitude modulation (PAM) scheme. In the pulse amplitude modulation (PAM) scheme, the amplitude of the driving voltage having a pulse shape may be changed corresponding to the driving voltage applied to the liquid lens 28 and a target driving voltage Vrms.

In a general pulse amplitude modulation (PAM) scheme, the magnitude of the pulse is adjusted. However, referring to FIG. 13, the period of the pulse as well as the magnitude of the pulse may be adjusted. The pulse-type driving voltage applied to the common electrode C0 and the individual electrode L1 of the liquid lens 28 may be adjusted in magnitude of the pulse thereof, and may have different pulse periods P1 and P2. The period P2 at the time point at which a driving voltage having a uniform level is applied may be longer than the period P1 at the time point at which the level of the driving voltage is changed.

In order to realize optical image stabilization (OIS), if the driving voltage for adjusting the movement of the interface in the liquid lens is changed within a short time, the operation speed of the liquid lens may increase. To this end, a voltage higher than the target driving voltage may be applied, and thereafter a voltage lower than the target driving voltage may be applied, thereby realizing a faster change in the driving voltage while reducing undulation of the liquids. In addition, in order to further increase the operation speed of the liquid lens, the period of the pulse-type driving voltage applied to the common electrode C0 and the individual electrode L1 may be changed. In order to control the change in the driving voltage more rapidly and precisely, the pulse period of the driving voltage may be changed. That is, the pulse period P1 in the first switching section O1 and the second switching section O2, described with reference to FIG. 11(b), may be shorter than the pulse period P2 in other sections. This may also be applied to the driving voltage described with reference to FIG. 13 in a similar manner.

THIRD EMBODIMENT

FIGS. 14(a) and (b) are waveform diagrams for explaining a method of controlling the liquid lens through the supply of an overshooting voltage.

Specifically, the driving voltage supplied to the liquid lens 28 may be determined through a pulse width modulation (PWM) scheme. FIG. 14(a) illustrates the case in which an overshooting voltage is not used, and FIG. 14(b) illustrates the case in which an overshooting voltage is used. In the cases shown in FIGS. 14(a) and (b), the period of the driving voltage is uniform.

First, referring to FIG. 14(a), it is assumed that the change in the curvature or the focus of the interface of the liquid lens 28 (refer to FIGS. 3 and 4) from a third state S3 to a fourth state S4 is required. Since the driving voltage of the liquid lens 28 is a main factor for determining the shape of the interface of the liquid lens, the curvature or the focal length of the interface of the liquid lens corresponding to the Vrms value of the driving voltage may be determined. Accordingly, the effective voltage Vrms may be changed by changing the driving voltage V in order to switch from the third state S3 to the fourth state S4. The driving voltage V may be adjusted by adjusting the voltage applied to the common electrode or the individual electrode of the liquid lens. The driving voltage V may change the amount of electrical energy that is actually transmitted by changing the duty ratio in a predetermined period. For example, the duty ratio of the driving voltage in the fourth state S4 may be greater than that in the third state S3. The duty ratio D2 in the fourth state S4 may be greater than the duty ratio D1 in the third state S3. An effective value (e.g. a root mean square (RMS)) with respect to the driving voltage V having such a waveform may be calculated as the effective voltage Vrms. The shape of the interface of the liquid lens is changed in the third state S3 and the fourth state S4 in response to the change in the effective voltage Vrms, whereby the focal point of the liquid lens may be adjusted.

Since the position, curvature, or movement of the interface in the liquid lens, which is formed between the two liquids, is realized by the change in the liquids, the refractive index of the liquid lens may exhibit an unstable waveform and may then be gradually stabilized, as shown in the drawings. If the time taken until the interface in the liquid lens is stabilized after inducing the movement of the interface, i.e. until the refractive index is stably changed, is shortened, the camera module or the optical device equipped with the liquid lens may operate more rapidly.

Referring to FIG. 14(b), when switching from the third state S3 to the fourth state S4 is required in order to increase the operation speed of the liquid lens and to reduce the unstable wave, a third switching section O3 and a fourth switching section O4 may be present between two states (e.g. the third state S3 and the fourth state S4), i.e. at the switching point of time. The third switching section O3 may be an overshooting voltage period. A voltage having a magnitude that is higher by 30% or more than the target voltage may be applied in the third switching section O3. In addition, in order to prevent an overshooting voltage or an undershooting voltage, not falling within a normal range, from being applied to the liquid lens, a voltage having a magnitude that is lower by 15% or less than the target voltage may be applied in the fourth switching section O4, thereby reducing the application of the overshooting voltage at the initial driving stage. In the fourth state S4 after the third switching section O3 and the fourth switching section O4, a driving voltage that falls within the target voltage range may be applied to the liquid lens. In an example, the duty ratios D1, D3, D4 and D2 in the third state S3, the third switching section O3, the fourth switching section O4, and the fourth state S4 may be determined to have the following magnitudes: D3>D2>D4>D1.

FIG. 14(b) illustrates the case in which the third switching section O3 and the fourth switching section O4 are present in the process of switching from the third state S3, in which the effective voltage Vrms is low, to the fourth state S4, in which the effective voltage Vrms becomes high. Meanwhile, a plurality of switching sections may be included in the process of switching from the state in which the effective voltage Vrms is high to the state in which the effective voltage Vrms is low. For example, a voltage having a magnitude that is lower by 30% or less than the target voltage may be applied in the third switching section, and thereafter a voltage having a magnitude that is higher by 15% or more than the target voltage may be applied in the fourth switching section, thereby realizing faster movement of the liquid lens. Although the case in which two switching sections, namely the third and fourth switching sections, are present has been described above by way of example, the embodiment is not limited thereto. Additional switching sections may be further present.

As described above, according to the control device and method of the liquid lens, at the time point at which the magnitude of the driving voltage applied to the liquid lens is changed, particularly, when the change in the driving voltage is large, a plurality of switching sections may be set in order to realize fast operation of the liquid lens. For example, a voltage that differs in magnitude from the target voltage by 30% or more or by 30% or less may be applied in one of the plurality of switching sections, and thereafter a voltage that differs in magnitude from the target voltage by 15% or less or by 15% or more may be applied in the other switching section.

FIGS. 15(a) and (b) are waveform diagrams for explaining a method of controlling the liquid lens through the supply of an overshooting voltage according to the embodiment. Specifically, the driving voltage supplied to the liquid lens 28 may be determined through a pulse width modulation (PWM) scheme. FIG. 15(a) illustrates the case in which an overshooting voltage is not used, and FIG. 15(b) illustrates the case in which an overshooting voltage is used. The case shown in FIG. 15(b) includes a section in which the period of the driving voltage is varied.

First, referring to FIG. 15(a), the case shown therein is the same as that shown in FIG. 14(a).

Referring to FIG. 15(b), when switching from the third state S3 to the fourth state S4 is required in order to increase the operation speed of the liquid lens, a third switching section O3 and a fourth switching section O4 may be present between two states (e.g. the third state S3 and the fourth state S4), i.e. at the switching point of time. The third switching section O3 may be an overshooting voltage period. In the third switching section O3, a voltage having a magnitude that is higher by 30% or more than the target voltage may be applied. In addition, in order to prevent an overshooting voltage or an undershooting voltage, not falling within a normal range, from being applied to the liquid lens 28, a voltage having a magnitude that is lower by 15% or less than the target voltage may be applied in the fourth switching section O4, thereby reducing the application of the overshooting voltage at the initial driving stage. In the fourth state S4 after the third switching section O3 and the fourth switching section O4, a driving voltage that falls within the range of the target voltage may be applied to the liquid lens.

In addition, the pulse period P4 of the driving voltage applied to the liquid lens in the third switching section O3 and the fourth switching section O4 may be shorter than the pulse period P5 of the driving voltage applied to the liquid lens in the third state S3 and the fourth state S4. At the time point at which the change in the driving voltage is required, the pulse period P4 of the driving voltage may be shortened, and in the state in which there is no change in the driving voltage, the pulse period P5 of the driving voltage may be increased.

FIG. 15(b) illustrates the case in which the third switching section O3 and the fourth switching section O4 are present in the process of switching from the third state S3, in which the effective voltage Vrms is low, to the fourth state S4, in which the effective voltage Vrms becomes high. Meanwhile, a plurality of switching sections may be included in the process of switching from the state in which the effective voltage Vrms is high to the state in which the effective voltage Vrms is low. For example, a voltage having a magnitude that is lower by 30% or less than the target voltage may be applied in the third switching section, and thereafter a voltage having a magnitude that is higher by 15% or more than the target voltage may be applied in the fourth switching section, thereby realizing faster movement of the liquid lens.

As described above, according to the control device and method of the liquid lens according to the embodiment, at the time point at which the magnitude of the driving voltage applied to the liquid lens is changed, particularly, when the change in the driving voltage is large, a plurality of switching sections may be set in order to realize fast operation of the liquid lens. For example, a voltage that differs in magnitude from the target voltage by 30% or more or by 30% or less may be applied in one of the plurality of switching sections, and thereafter a voltage that differs in magnitude from the target voltage by 15% or less or by 15% or more may be applied in the other switching section.

FIG. 15(b) illustrates an embodiment in which there are different pulse periods (operating frequencies) corresponding to the section in which there is no change in the driving voltage and the section in which there is a change in the driving voltage. However, in some embodiments, the pulse period (the operating frequency) may be further segmented and varied. Respectively different pulse periods may be used depending on the case in which the driving voltage increases, the case in which the driving voltage decreases, the case in which the driving voltage is maintained at a high voltage, or the case in which the driving voltage is maintained at a low voltage.

FIG. 16 is a block diagram of a control circuit of a liquid lens according to a third embodiment.

As shown in FIG. 16, the interface 30 of the liquid lens 28 may be controlled in response to the driving voltages that are formed by voltages VL1, VL2, VL3 and VL4 transmitted to the plurality of individual electrode sectors L1, L2, L3 and L4 and a voltage VC0 transmitted to the common electrode C0. The change in the position, movement, or shape of the interface 30 in the liquid lens 28 may occur due to the voltage difference between the first to fourth voltages VL1, VL2, VL3 and VL4 applied to the first to fourth individual electrodes and the voltage VC0 applied to the common electrode C0.

The voltages VL1, VL2, VL3, VL4 and VC0 may be applied from the control circuit 50 of the liquid lens. The control circuit 50 of the liquid lens may control variation in the diopter of the interface in the liquid lens, or may control the voltages applied to the plurality of individual electrodes L1, L2, L3 and L4 and the common electrode C0 (refer to FIG. 3) in the liquid lens in order to change the diopter. In addition, the control circuit 50 of the liquid lens may set and control a switching section in the process in which voltages are applied to the plurality of individual electrodes L1, L2, L3 and L4 and the common electrode C0 to change the driving voltages.

The control circuit 50 of the liquid lens may include a lens-driving determination unit 54 for determining the change in the diopter of the interface 30 of the liquid lens 28, a voltage generator 56 for controlling the voltages to be applied to the plurality of individual electrode sectors L1, L2, L3 and L4 and the common electrode sector C0 in the liquid lens 28 in response to the change in the diopter, and a switching voltage controller 59 for controlling at least one switching section at the time point at which the driving voltages applied to the plurality of individual electrode sectors L1, L2, L3 and L4 and the common electrode sector C0 are changed in response to the change in the diopter. The control circuit 50 of the liquid lens may receive information about the movement of the liquid lens 28 from various sensors (e.g. a gyro sensor or the like) included in the device in which the liquid lens is mounted. In addition, when the diopter of the liquid lens 28 is changed by user input through a user interface or the like, information corresponding to the input may be transmitted to the control circuit 50 of the liquid lens.

When a compensation value based on which compensation is to be performed through the movement of the interface 30 in the liquid lens 28 is determined, the voltages VL1, VL2, VL3, VL4 and VC0 corresponding thereto may be applied to the plurality of individual electrodes L1, L2, L3 and L4 and the common electrode C0 in the liquid lens 28, respectively. In this process, in response to the target voltage of the driving voltage of the liquid lens, the switching voltage controller 59 may apply voltages that are higher or lower than the target voltage by a predetermined range to the plurality of individual electrodes L1, L2, L3 and L4 and the common electrode C0 during the switching section.

For example, when the voltages VL1, VL2, VL3 and VL4 applied to the first to fourth individual electrodes L1, L2, L3 and L4 are changed from 30 V to 50 V, a switching section may be controlled such that a voltage that is higher by 30% or more than the target voltage of 50 V is applied and thereafter a voltage that is lower by 15% or less than the target voltage of 50 V is applied. When the first driving voltage VL1 is supplied to the first individual electrode L1, a voltage that is higher or lower than the target voltage by a predetermined range may be applied through the switching voltage controller 59 that controls the switching section.

In some embodiments, in the process in which the voltages supplied to the first to fourth individual electrodes L1, L2, L3 and L4 are changed, the switching sections with respect to the respective individual electrodes may be controlled sequentially, or may be controlled simultaneously. At the time point at which the magnitude of the driving voltage applied to the liquid lens 28 is changed, particularly, when the change in the driving voltage is large, the switching voltage controller 59 may set a plurality of switching sections and may control the magnitude of the voltage applied in the switching sections in order to realize fast operation of the liquid lens. For example, depending on the change (increase or decrease) in the driving voltage, a voltage that differs in magnitude from the target voltage by 30% or more or by 30% or less may be applied in one of the plurality of switching sections, and a voltage that differs in magnitude from the target voltage by 15% or less or by 15% or more may be applied in the other switching section.

FIGS. 17a and 17b are waveform diagrams for explaining a method of driving the liquid lens according to the third embodiment.

Referring to FIG. 17a, the driving voltages supplied to the liquid lens 28 may be applied through the common electrode C0 and the individual electrodes L1 to L4 (refer to FIG. 16). The driving voltage V having an influence on the change in the interface in the liquid lens may be substantially the same as the absolute value of the difference between the voltage applied to the common electrode C0 and the voltage applied to the individual electrode L1.

As described with reference to FIG. 15, the driving voltages may be applied through the common electrode C0 and the individual electrodes L1 to L4 using a pulse width modulation (PWM) scheme. In the pulse width modulation (PWM) scheme, the duty ratio of the pulse-type driving voltage may be changed corresponding to the driving voltage applied to the liquid lens and a target driving voltage Vrms.

In a general pulse width modulation (PWM) scheme, the duty ratio of the pulse is adjusted. However, referring to FIG. 17, the period (the operating frequency) of the pulse as well as the duty ratio of the pulse may be adjusted. The pulse-type driving voltage applied to the common electrode C0 and the individual electrode L1 of the liquid lens may be adjusted in pulse width, and may have different pulse periods P4 and P5. The period P5 in the section in which a driving voltage having a uniform level is applied may be longer than the period P4 in the section in which the level of the driving voltage is changed.

In order to realize optical image stabilization (OIS), if the driving voltage for adjusting the movement of the interface in the liquid lens is changed within a short time, the operation speed of the liquid lens may increase. To this end, a voltage higher than the target driving voltage may be applied, and thereafter a voltage lower than the target driving voltage may be applied, thereby realizing a faster change in the driving voltage. In addition, in order to further increase the operation speed of the liquid lens, the period of the pulse-type driving voltage applied to the common electrode C0 and the individual electrode L1 may be changed. In order to control the change in the driving voltage more rapidly, the pulse period of the driving voltage may be changed. That is, the pulse period P4 in the third switching section O3 and the fourth switching section O4 described with reference to FIG. 15(b) may be shorter than the pulse period P5 in other sections. This may also be applied to the driving voltage described with reference to FIG. 17 in a similar manner.

Referring to FIG. 17b, in order to realize the target driving voltage Vrms, the period or the operating frequency of the voltage applied to the common electrode C0 and the individual electrode L1 is variously changed (P0, P4, P5, etc.). The pulse of the driving voltage V, which is determined by the difference in voltage between the common electrode C0 and the individual electrode L1, may be changed by changing the period or the operating frequency of the driving voltage applied to the common electrode C0 and the individual electrode L1.

FIGS. 18(a) and (b) are waveform diagrams for explaining a method of controlling the driving voltages of the liquid lens. Specifically, the embodiment described with reference to FIGS. 18(a) and (b) may adjust a period (an operating frequency), unlike a general pulse width modulation (PWM) scheme.

Referring to FIG. 18(a), as described with reference to FIGS. 14(b) and 16, the duty ratio and the period of the driving voltage applied to the common electrode C0 and the individual electrode L1 are changed. In particular, the period of the driving voltage applied to the common electrode C0 and the individual electrode L1 is changed from a long period P41 to a short period P42, and the duty ratio is changed from 50% to 75%. Here, the driving voltage V having an influence on the interface of the liquid lens is the difference (the absolute value) between the driving voltage applied to the common electrode C0 and the driving voltage applied to the individual electrode L1. The magnitude of the driving voltage V having an influence on the interface of the liquid lens may be adjusted by controlling the duty ratio of the driving voltage applied to the common electrode C0 and the individual electrode L1. In addition, it is possible to realize more precise and accurate control (reduction of noise, damping, or the like) by changing the period (the operating frequency) of the driving voltage applied to the common electrode C0 and the individual electrode L1.

Meanwhile, the case in which the duty ratio of the driving voltage applied to the common electrode C0 and the duty ratio of the driving voltage applied to the individual electrode L1 are equally changed (from 50% to 75%) has been described by way of example. However, the duty ratio of the driving voltage applied to the common electrode C0 and the duty ratio of the driving voltage applied to the individual electrode L1 may be adjusted to be different from each other. For example, the duty ratio of the common electrode C0 may be 50%, and the duty ratio of the individual electrode L1 may be 75%. In addition, the duty ratios of the driving voltages applied to the respective individual electrodes L1 to L4 (refer to FIG. 15) may be the same as or different from each other. Using this method, the magnitudes of the driving voltages V applied through the respective individual electrodes L1 to L4 and the common electrode C0 of the liquid lens may be adjusted to be the same as or different from each other, whereby the focal point of the liquid lens may be controlled.

In addition, referring to FIG. 18(b), the driving voltage V having an influence on the interface of the liquid lens is adjusted in a manner such that, in the state in which the duty ratio of the driving voltage applied to the common electrode C0 and the duty ratio of the driving voltage applied to the individual electrode L1 are the same as each other, the period of the driving voltage of the common electrode C0 remains a long period P43, and the period of the driving voltage of the individual electrode L1 is changed from the long period P43 to a short period P44. Even when the duty ratio of the driving voltage applied to the common electrode C0 and the duty ratio of the driving voltage applied to the individual electrode L1 are adjusted to be the same as each other (e.g. 50%), the period of the driving voltage applied to the common electrode C0 and the period of the driving voltage applied to the individual electrode L1 may be adjusted to be different from each other. That is, the period of the driving voltage applied to the common electrode C0 and the period of the driving voltage applied to the individual electrode L1 may be equally or differently adjusted. In addition, the periods of the driving voltages applied to the respective individual electrodes L1 to L4 (refer to FIG. 15) may be adjusted to be different from or the same as one another. In this way, the magnitudes of the driving voltages V applied through the respective individual electrodes L1 to L4 and the common electrode C0 of the liquid lens may be adjusted to be different from or the same as one another, whereby the focal point of the liquid lens may be controlled.

The contents of the respective embodiments described above may be applied to other embodiments or may be combined as long as they are not incompatible with one another.

Although only a limited number of embodiments have been described above, various other embodiments are possible. The technical contents of the above-described embodiments may be combined into various forms as long as they are not incompatible with one another, and thus may be implemented in new embodiments.

An optical device (or an optical instrument) including the above-described camera module may be implemented. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include the liquid lens. In addition, the optical device may be implemented in a portable device such as, for example, a smartphone, a laptop computer, or a tablet computer. Such an optical device may include a camera module, a display unit configured to output an image, and a body housing in which the camera module and the display unit are mounted. A communication module, which may communicate with other devices, may be mounted in the body housing of the optical device, and the optical device may further include a memory unit capable of storing data.

The method according to the embodiment described above may be programmed to be executed in a computer and may be stored on a computer-readable recording medium. Examples of the computer-readable recording medium include ROM, RAM, CD-ROMs, magnetic tapes, floppy disks, and optical data storage devices.

The computer-readable recording medium may also be distributed over network-coupled computer systems so that the computer-readable code is stored and executed in a distributed fashion. Also, functional programs, code, and code segments for accomplishing the above-described method may be easily construed by programmers skilled in the art to which the embodiment pertains.

It will be apparent to those skilled in the art that various changes in form and details may be made without departing from the spirit and the essential characteristics of the disclosure set forth herein. Accordingly, the above detailed description is not intended to be construed as limiting the disclosure in all aspects and to be considered by way of example. The scope of the disclosure should be determined by reasonable interpretation of the accompanying claims, and all equivalent modifications made without departing from the disclosure should be included in the scope of the disclosure.

Mode for Invention

Various embodiments have been described in the best mode for carrying out the disclosure.

INDUSTRIAL APPLICABILITY

A control circuit of a liquid lens according to the embodiments may be used in portable devices such as, for example, camera/video devices, telescopic devices, microscopic devices, an interferometer, a photometer, a polarimeter, a spectrometer, a reflectometer, an auto-collimator, a lens-meter, a smartphone, a laptop computer, and a tablet computer.

The invention claimed is:

1. A circuit for controlling a liquid lens, the circuit comprising:
a liquid lens comprising a common electrode and a plurality of individual electrodes including first to fourth individual electrodes;
a voltage generator configured to supply a voltage to the plurality of individual electrodes and the common electrode in the liquid lens; and
a controller configured to control timing to sequentially supply the voltage to each of the individual electrodes,
wherein the controller applies the voltage to the second individual electrode after applying the voltage to the first individual electrode, applies the voltage to the third individual electrode after applying the voltage to the second individual electrode, and applies the voltage to the fourth individual electrode after applying the voltage to the third individual electrode, and
wherein the first to fourth individual electrodes are disposed at the same length from each other with respect to a center of the liquid lens.

2. The circuit according to claim 1, wherein the first individual electrode and the second individual electrode are disposed at positions symmetrical to each other with respect to the center of the liquid lens.

3. The circuit according to claim 1, wherein the controller sequentially applies the voltage to each of the individual electrodes at predetermined time intervals.

4. The circuit according to claim 1, wherein the timing is an integer multiple of a period of the voltage.

5. The circuit according to claim 1, wherein the controller applies the voltage to the first individual electrode to the fourth individual electrode in order from a high voltage to a low voltage.

6. A circuit for controlling a liquid lens, the circuit comprising:
a liquid lens comprising a common electrode and a plurality of individual electrodes;
a voltage generator configured to control a magnitude of an input voltage and generate an output voltage; and
a voltage period controller configured to control a period of a voltage supplied to the common electrode and the plurality of individual electrodes using the output voltage of the voltage generator,
wherein, when a voltage applied to at least one of the common electrode or the plurality of individual electrodes is changed, the period of the voltage comprises a section in which the period switches from a predetermined first period to a second period, the second period being shorter than the first period, and
wherein corners of the liquid lens are thinner than a center portion of the liquid lens.

7. The circuit according to claim 6, wherein the period of the voltage comprises a section in which switching to the first period is performed after the section in which switching to the second period is performed.

8. The circuit according to claim 7, wherein an amplitude of a voltage in the section in which the period of the voltage is the second period comprises a first amplitude and a second amplitude, the first amplitude and the second amplitude being different from each other.

9. The circuit according to claim 8, wherein an amplitude in the section in which switching to the first period is performed after the section in which switching to the second period is performed is between the first amplitude and the second amplitude.

10. The circuit according to claim 6, wherein an amplitude of a voltage applied to any one of the plurality of individual electrodes and an amplitude of a voltage applied to the common electrode correspond to each other.

11. A circuit for controlling a liquid lens, the circuit comprising:
- a liquid lens comprising a common electrode and a plurality of individual electrodes;
- a voltage generator configured to generate a driving voltage to drive the liquid lens; and
- a voltage period controller configured to control a magnitude of the driving voltage at the time point at which an amplitude of the driving voltage is changed,
- wherein, when an amplitude of a driving voltage applied between the common electrode and one of the plurality of individual electrodes changes from a first amplitude to a second amplitude, the driving voltage comprises a first section in which the amplitude of the driving voltage increases and a second section in which the amplitude of the driving voltage decreases,
- wherein the second amplitude is between a maximum amplitude in the first section and a minimum amplitude in the second section, and
- wherein corners of the liquid lens are thinner than center portion of the liquid lens.

12. The circuit according to claim 11, wherein a period of a voltage in the first section and the second section is shorter than a period of a driving voltage applied at the first amplitude and the second amplitude.

13. The circuit according to claim 11, wherein, when the first amplitude is smaller than the second amplitude, the maximum amplitude in the first section is 130% or more of the second amplitude, and the minimum amplitude in the second section is 85% or less of the second amplitude.

14. A circuit for controlling a liquid lens, the circuit comprising:
- a liquid lens comprising a common electrode and a plurality of individual electrodes;
- a voltage generator configured to generate a driving voltage to drive the liquid lens; and
- a switching voltage controller configured to control a duty ratio of the driving voltage at the time point at which a magnitude of the driving voltage is changed,
- wherein, when a Vrms value of a driving voltage applied between the common electrode and one of the plurality of individual electrodes changes from a first Vrms value to a second Vrms value, the driving voltage comprises a first section in which a duty ratio of the driving voltage is changed and a second section having a duty ratio different from a duty ratio in the first section, and
- wherein a duty ratio in at least one of the first section or the second section is greater than a duty ratio in a section having the second Vrms value.

15. The circuit according to claim 14, wherein, when the second Vrms value is greater than the first Vrms value, the duty ratio in the section having the second Vrms value is smaller than the duty ratio in the first section.

16. The circuit according to claim 14, wherein, when the second Vrms value is greater than the first Vrms value, a duty ratio in a section having the second Vrms value is greater than a duty ratio in a section having the first Vrms value.

17. The circuit according to claim 16, wherein the first section has a third Vrms value, the second section has a fourth Vrms value, and the Vrms values meet the following requirements: third Vrms value>second Vrms value>fourth Vrms value>first Vrms value.

18. The circuit according to claim 14, wherein, when the first Vrms value is greater than the second Vrms value, a duty ratio in a section having the second Vrms value may be greater than a duty ratio in the first section.

19. The circuit according to claim 14, wherein, when the second Vrms value is smaller than the first Vrms value, a duty ratio in a section having the second Vrms value is smaller than a duty ratio in a section having the first Vrms value.

20. The circuit according to claim 14, wherein a height and a period of a pulse of the driving voltage are uniform.

* * * * *